US011980163B2

(12) United States Patent
Moran

(10) Patent No.: US 11,980,163 B2
(45) Date of Patent: May 14, 2024

(54) ANIMAL FEEDER

(71) Applicant: Daniel E. Moran, Brady, TX (US)

(72) Inventor: Daniel E. Moran, Brady, TX (US)

(*) Notice: Subject to any disclaimer, the term of this patent is extended or adjusted under 35 U.S.C. 154(b) by 79 days.

(21) Appl. No.: 17/970,071

(22) Filed: Oct. 20, 2022

(65) Prior Publication Data
US 2024/0107978 A1 Apr. 4, 2024

Related U.S. Application Data

(60) Provisional application No. 63/412,401, filed on Oct. 1, 2022.

(51) Int. Cl.
*B60P 1/28* (2006.01)
*A01K 1/10* (2006.01)

(52) U.S. Cl.
CPC . *A01K 1/10* (2013.01); *B60P 1/28* (2013.01)

(58) Field of Classification Search
CPC ........................................................ B60P 1/28
See application file for complete search history.

(56) References Cited

U.S. PATENT DOCUMENTS

| | | | |
|---|---|---|---|
| 2,520,458 | A | 8/1950 | Doherty |
| 3,972,308 | A | 8/1976 | Ray |
| 4,067,298 | A | 1/1978 | Jones et al. |
| 4,078,523 | A | 3/1978 | Etzler |
| 5,331,922 | A | 7/1994 | Olynyk |
| 5,333,981 | A * | 8/1994 | Pronovost ............ A01D 90/083 414/501 |
| 5,383,714 | A * | 1/1995 | Hunter ..................... B60P 1/16 298/22 C |
| 5,730,572 | A | 3/1998 | Scheuren |
| 5,743,211 | A | 4/1998 | Schoessow |
| 6,171,047 | B1 * | 1/2001 | Vandervalk .......... A01D 90/105 414/24.5 |
| 6,213,053 | B1 | 4/2001 | Lammers |
| 6,332,426 | B1 | 12/2001 | van den Berg |
| 6,481,373 | B2 | 11/2002 | Swetzig |
| 7,055,459 | B2 | 6/2006 | Fehringer et al. |
| 8,720,373 | B1 | 5/2014 | Tesinsky |
| 9,567,169 | B2 | 2/2017 | Camilletti et al. |
| 9,961,877 | B1 * | 5/2018 | Aulick ............. B01F 35/22142 |

(Continued)

FOREIGN PATENT DOCUMENTS

GB        2162038 A        1/1986

*Primary Examiner* — Jonathan Snelting
(74) *Attorney, Agent, or Firm* — Christopher L. Makay

(57) ABSTRACT

An animal feeder, moveable between a feed transport position and a feed delivery position that successively delivers animal feed contained within the animal feeder, includes a bunk and a dump trailer. The dump trailer supports the bunk at a rear thereof while remaining pivotable relative to the bunk. The dump trailer, which holds animal feed therein, includes a lowered transport position that locates the animal feeder in the feed transport position and a raised delivery position that locates the animal feeder in the feed delivery position. The dump trailer, when moved from the feed transport position to the raised delivery position, pivots relative to the bunk whereby the dump trailer at an exit thereof communicates with the bunk at an entrance thereof such that the dump trailer in the raised delivery position successively delivers animal feed held therein into the bunk for access by animals.

22 Claims, 16 Drawing Sheets

(56) References Cited

U.S. PATENT DOCUMENTS

| | | |
|---|---|---|
| 11,000,010 B2 | 5/2021 | Studebaker, Jr. |
| 11,252,936 B1 | 2/2022 | Viane |
| 2007/0044724 A1 | 3/2007 | Kvols |
| 2011/0064542 A1 | 3/2011 | Hertzog et al. |

* cited by examiner

ANIMAL FEEDER

BACKGROUND OF THE INVENTION

1. Field of the Invention

The present invention relates generally to a method and apparatus for feeding animals and, more particularly, but not way of limitation, to an animal feeder including a dump trailer and a bunk configured to deliver feed to animals, such as for example livestock.

2. Description of the Related Art

Feeding animals, such as for example livestock, typically involves delivering feed in the form of hay bales into a pasture containing the animals. The hay bales generally are loaded onto a trailer which is then brought into the pasture. In one trailer design, the trailer is unloaded with the hay bales being left on the ground prior to the removal of the trailer from the pasture. Although this provides hay for the animals, the hay bales on account of being on the ground are stepped upon by the animals and break apart during feeding such that a significant portion of hay from each hay bale ends up on the ground. The animals during subsequent feedings step upon and soil the hay on the ground thereby ruining the hay, which is both wasteful and costly. In an alternative trailer design, the trailer in order to maintain the hay bales off the ground allows the animals to access the hay bales from the trailer such that the trailer is left in the pasture loaded. While the hay bales remain off the ground, the animals still drop hay on the ground, particularly as the hale bales break apart. The animals, since they can feed from any one of the hay bales within the trailer, ignore the hay on the ground during subsequent feedings, resulting in the hay on the ground being stepped upon and soiled thereby ruining the hay, which again is both wasteful and costly.

Accordingly, a method and apparatus for feeding animals that maintains feed off the ground while also restricting access to the feed in order to limit waste and prolong the time between feed resupply will improve over current feeding systems and methods.

SUMMARY OF THE INVENTION

In accordance with the present invention, an animal feeder moves between a feed transport position and a feed delivery position that successively delivers animal feed contained within the animal feeder. The animal feeder includes a bunk and a dump trailer that holds animal feed therein. The dump trailer supports the bunk at a rear thereof while remaining pivotable relative to the bunk. The dump trailer includes a lowered transport position that locates the animal feeder in the feed transport position and a raised delivery position that locates the animal feeder in the feed delivery position. The dump trailer, when moved from the feed transport position to the raised delivery position, pivots relative to the bunk such that the dump trailer at an exit thereof communicates with the bunk at an entrance thereof. In accordance therewith, the dump trailer in the raised delivery position successively delivers animal feed held therein into the bunk for access by animals. Moreover, the dump trailer, upon animals consuming the animal feed within the bunk, re-delivers the animal feed held therein into the bunk for access by animals until depletion of the animal feed held within the dump trailer.

The dump trailer includes a frame, a dump bed having a width, and a lift system. The dump bed, which is configured to hold animal feed therein, includes a floor supporting sidewalls and a front wall. The floor and the sidewalls at a rear of the dump bed define an exit from the dump bed that forms the exit for animal feed from the dump trailer. The frame supports the dump bed while the dump bed remains pivotable relative to the frame. The lift system connects the dump bed with the frame. The lift system lowers the dump bed to a lowered position such that the dump bed pivots atop the frame thereby placing the dump trailer in the lowered transport position. The lift system further raises the dump bed to a raised position such that the dump bed pivots over the frame thereby placing the dump trailer in the raised delivery position.

The bunk rigidly connects with the frame. The bunk further connects with the dump bed at the rear of the dump bed adjacent the exit of the dump bed whereby the dump bed remains pivotable relative to the bunk. When the lift system moves the dump bed from the lowered position to the raised position, the dump bed pivots relative to the bunk such that the dump bed at the exit thereof communicates with the bunk at the entrance thereof. In accordance therewith, the dump bed in the raised position successively delivers animal feed held therein into the bunk for access by animals. Moreover, the dump bed, upon animals consuming the animal feed within the bunk, re-delivers the animal feed held therein into the bunk for access by animals until depletion of the animal feed held within the dump bed.

The bunk, which has a width greater than the width of the dump bed, is configured to hold animal feed therein delivered from the dump bed. The bunk includes a floor supporting sidewalls and an end wall. The floor and the sidewalls at a front of the bunk define the entrance of the bunk. The sidewalls and the end wall include apertures that provide animals access to animal feed held within the bunk. The floor defines apertures configured to allow removal of left-over animal feed from the bunk. The sidewalls of the dump bed, due to the width of the bunk being greater than the width of the dump bed, reside interior to the sidewalls of the bunk. As a result, when the lift system moves the dump bed from the lowered position to the raised position while the dump bed pivots relative to the bunk, the dump bed at the sidewalls located at the rear of the dump bed enters the bunk at the sidewalls located at the front of the bunk such that the dump bed at the exit thereof communicates with the bunk at the entrance thereof. In accordance therewith, the dump bed in the raised position successively delivers animal feed held therein into the bunk for access by animals.

The floor of the bunk includes side support beams and at least one inner support beam secured between a front-end beam and a rear end beam. The floor further includes a plurality of crosspieces secured between the side support beams and the at least one inner support beam configured to define the apertures in the floor. The sidewalls of the bunk each include a front post, an inner post, and a rear post secured to the side support beams of the floor. The sidewalls further each include a top rail secured atop the front post, the inner post, and the rear post and a crosspiece secured between the inner post and the rear post. The sidewalls still further each include a plurality of uprights secured between the top rail and the crosspiece such that the inner post, the crosspiece, and the uprights are located to define different size apertures that form the apertures in each of the sidewalls of the bunk. The end wall of the bunk includes a top rail, a crosspiece, and outer uprights and at least one inner upright secured between the top rail and the crosspiece. The outer uprights further secure with the rear posts of the sidewalls of the bunk such that the outer uprights, the inner upright, and the crosspiece are located to define different size apertures that form the apertures of the end wall of the bunk.

The bunk connects with the dump bed while the dump bed remains pivotable relative to the bunk using a hinge. The hinge couples with the dump bed at the rear of the dump bed below the exit of the dump bed and with the bunk at the front of the bunk below the entrance of the bunk. When the lift system moves the dump bed from the lowered position to the raised position, the dump bed pivots about the hinge relative to the bunk such that the dump bed at the exit thereof communicates with the bunk at the entrance thereof. In accordance therewith, the dump bed in the raised position successively delivers animal feed held therein into the bunk for access by animals. The hinge includes a first barrel connected with the dump bed at the rear of the dump bed below the exit of the dump bed and a second barrel connected with the bunk at the front of the bunk below the entrance of the bunk. The first barrel and the second barrel align upon a positioning of the bunk at the front of the bunk below the entrance of the bunk adjacent the dump bed at the rear of the dump bed below the exit of the dump bed. The hinge further includes a pin configured to insert through the first barrel and the second barrel thereby forming the hinge that pivotably couples the bunk with the dump bed. The sidewalls of the dump bed, due to the width of the bunk being greater than the width of the dump bed, reside interior to the sidewalls of the bunk. As a result, when the lift system moves the dump bed from the lowered position to the raised position while the dump bed pivots about the hinge relative to the bunk, the dump bed at the sidewalls located at the rear of the dump bed enters the bunk at the sidewalls located at the front of the bunk such that the dump bed at the exit thereof communicates with the bunk at the entrance thereof. In accordance therewith, the dump bed in the raised position successively delivers animal feed held therein into the bunk for access by animals.

The bunk rigidly connects with the frame using a first brace and a second brace. The first brace connects at a first end with the frame and at a second end with one of the sidewalls of the bunk. The second brace connects at a first end with the frame and at a second end with an opposite one of the sidewalls of the bunk. The first and second braces rigidly connect the bunk with the frame such that the bunk is suspended at the rear of the dump bed adjacent the exit thereof. Disassembly of the hinge and disconnection of the first and second braces from the bunk allows removal of the bunk from the dump trailer.

The animal feed in one embodiment of the animal feeder includes at least a first hay bale and a second hay bale whereby the dump bed holds the first hay bale and the second hay bale therein. The dump bed, when the lift system moves the dump bed from the lowered position to the raised position, pivots relative to the bunk such that the dump bed at the exit thereof communicates with the bunk at the entrance thereof. In accordance therewith, the dump bed in the raised position delivers the first bale into the bunk for access by animals. The dump bed, upon animals consuming the first hay bale within the bunk, delivers the second hay bale into the bunk for access by animals.

The animal feeder includes a feed container configured to fit within the bunk. The feed container defines a continuous interior surface whereby the feed container holds discrete animal feed therein accessible to animals through the bunk. The feed container includes a floor, sidewalls supported by the floor at sides of the floor, and an end wall supported by the floor at a rear of the floor opposite to a front of the floor. The feed container fits within the bunk such that the sidewalls of the feed container contact respectively the sidewalls of the bunk and the end wall of the feed container contacts respectively the end wall of the bunk.

The animal feed in another embodiment of the animal feeder includes discrete animal feed whereby the dump bed holds the discrete animal feed therein while the bunk includes a feed container fit therein. The dump bed, when the lift system moves the dump bed from the lowered position to the raised position, pivots relative to the bunk such that the dump bed at the exit thereof communicates with the feed container at an entrance thereof. In accordance therewith, the dump bed in the raised position delivers the discrete animal feed into the feed container for access by animals through the bunk. The dump bed, upon animals consuming the discrete animal feed within the feed container, re-delivers the discrete animal feed held therein into the feed container for access by animals until depletion of the discrete animal feed held within the dump bed.

It is therefore an object of the present invention to provide an animal feeder that maintains animal feed off the ground while also restricting access to the animal feed in order to limit waste and prolong the time between feed resupply.

It is another object of the present invention to provide an animal feeder moveable between a feed transport position and a feed delivery position that successively delivers animal feed contained within the animal feeder.

Still other objects, features, and advantages of the present invention will become evident to those of ordinary skill in the art in light of the following. Also, it should be understood that the scope of this invention is intended to be broad, and any combination of any subset of the features, elements, or steps described herein is part of the intended scope of the invention.

DETAILED DESCRIPTION OF THE PREFERRED EMBODIMENT

Figure 1:
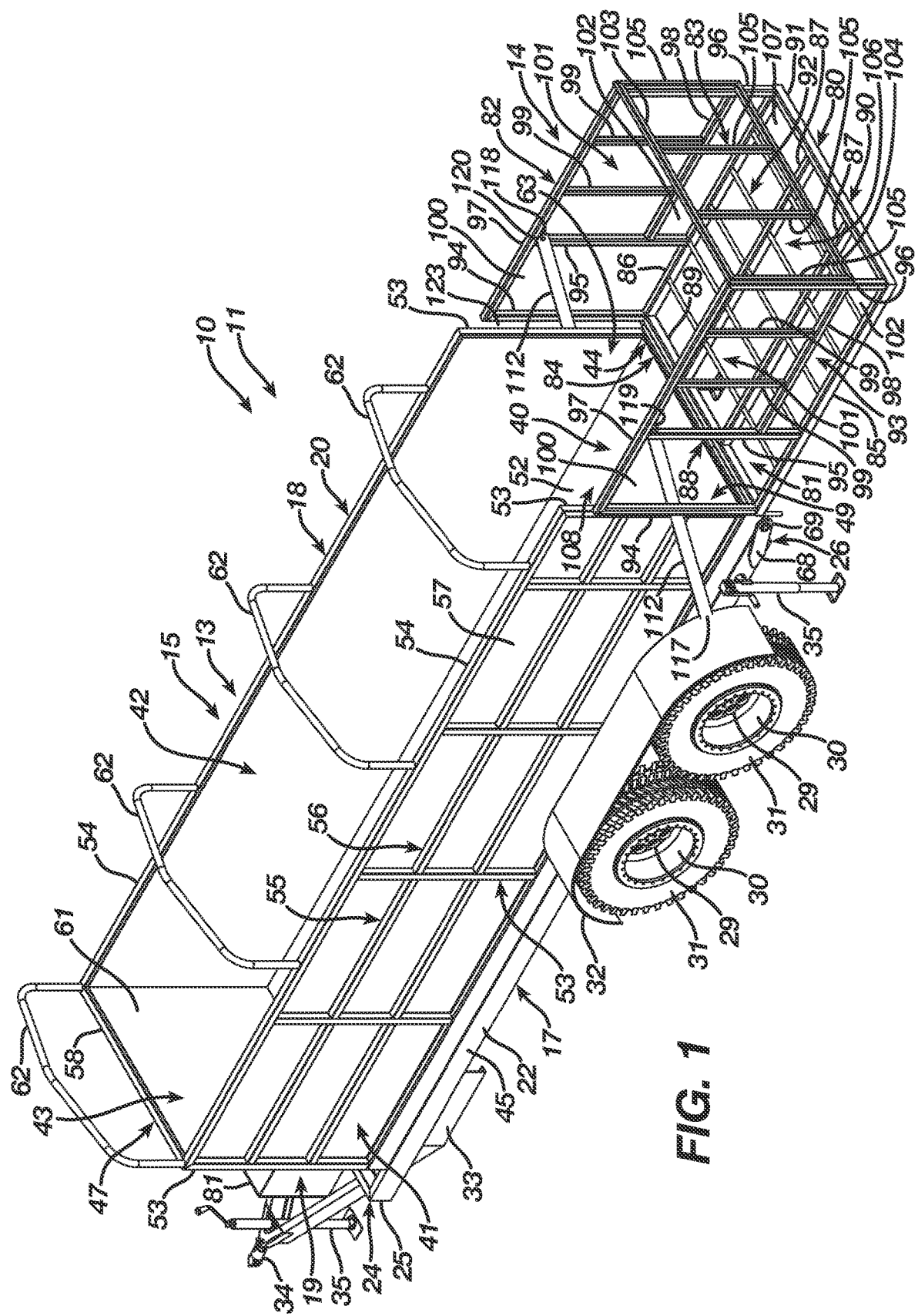
FIGS. 1 and 2 are isometric views illustrating an animal feeder according to a preferred embodiment in a feed transport position.
Figure 2:
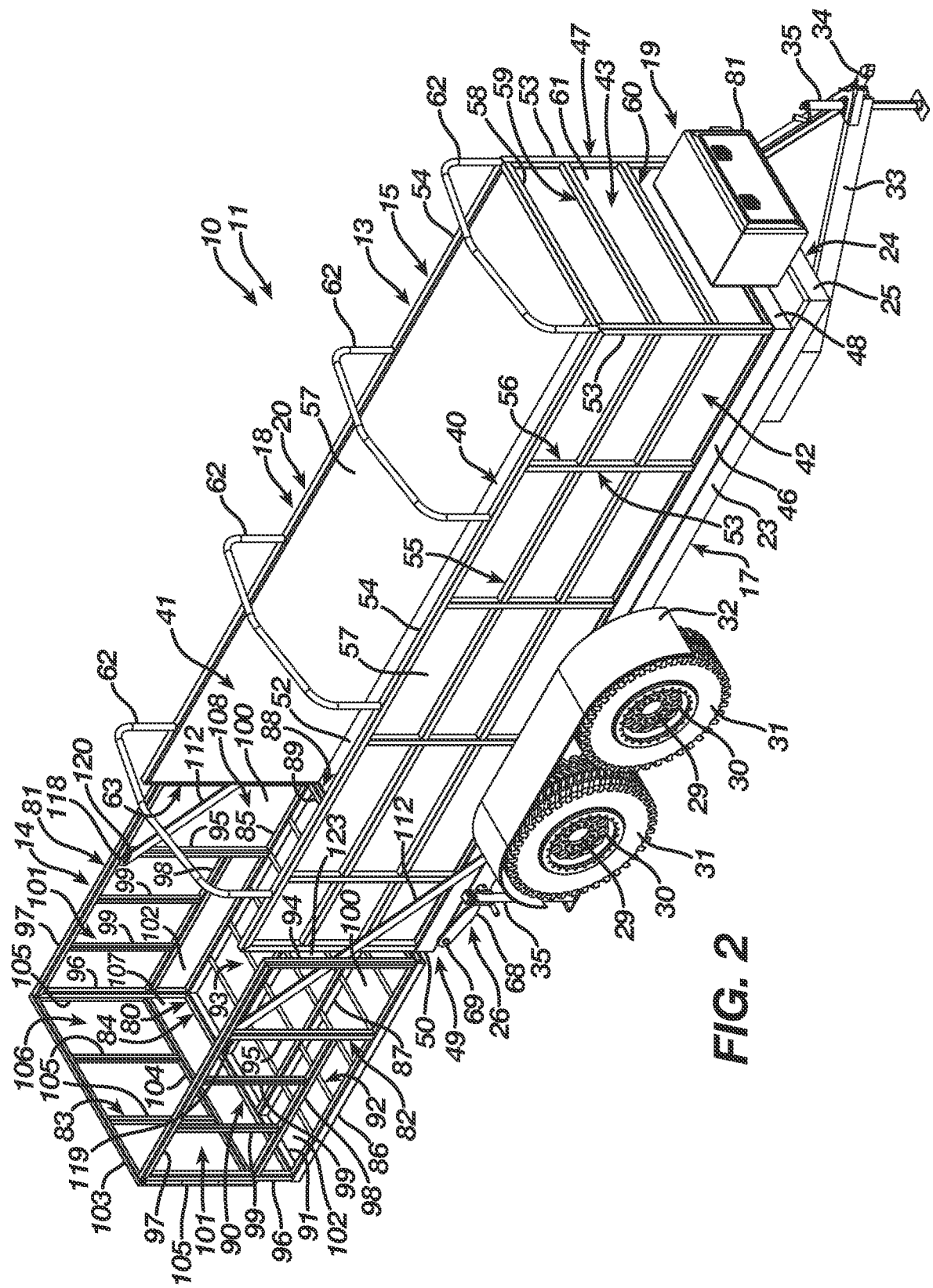
Figure 3:
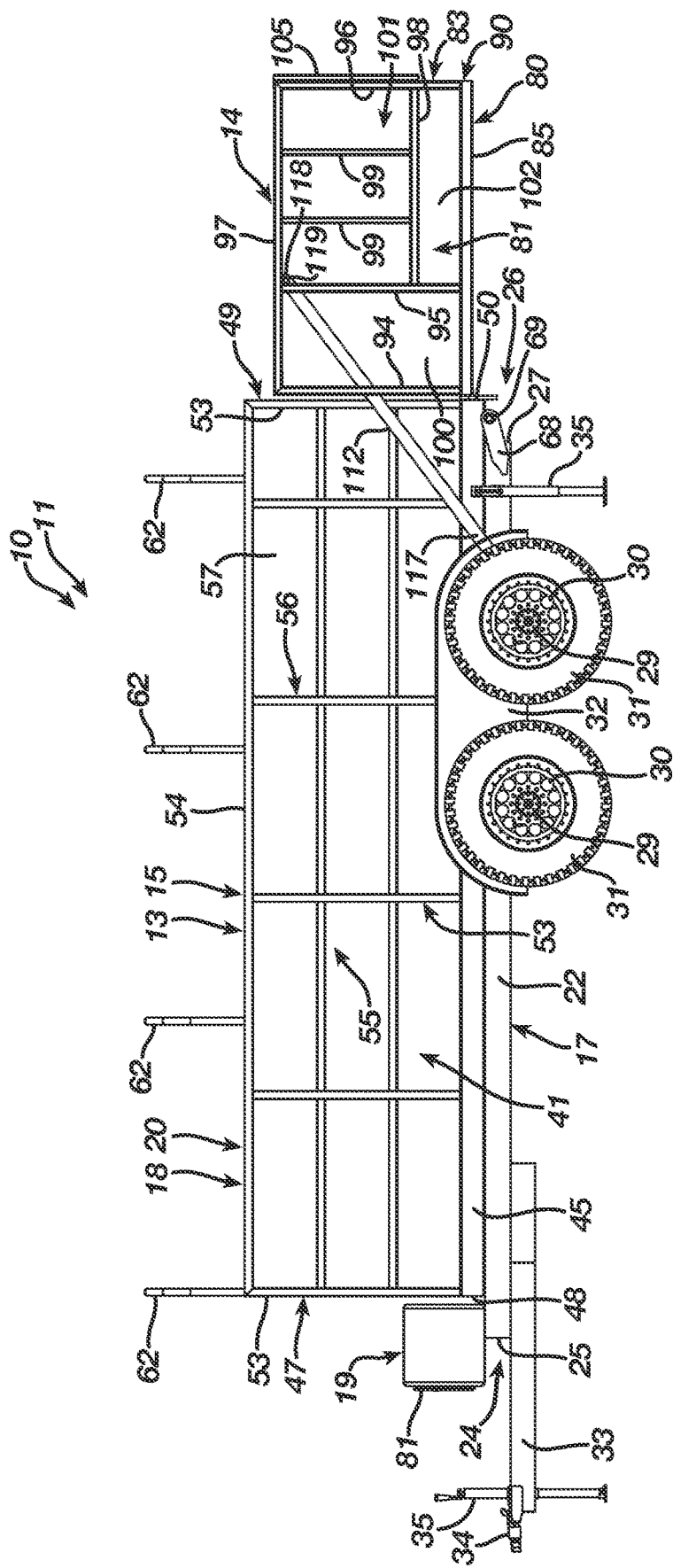
FIG. 3 is a side view illustrating the animal feeder according to the preferred embodiment in the feed transport position.
Figure 4:
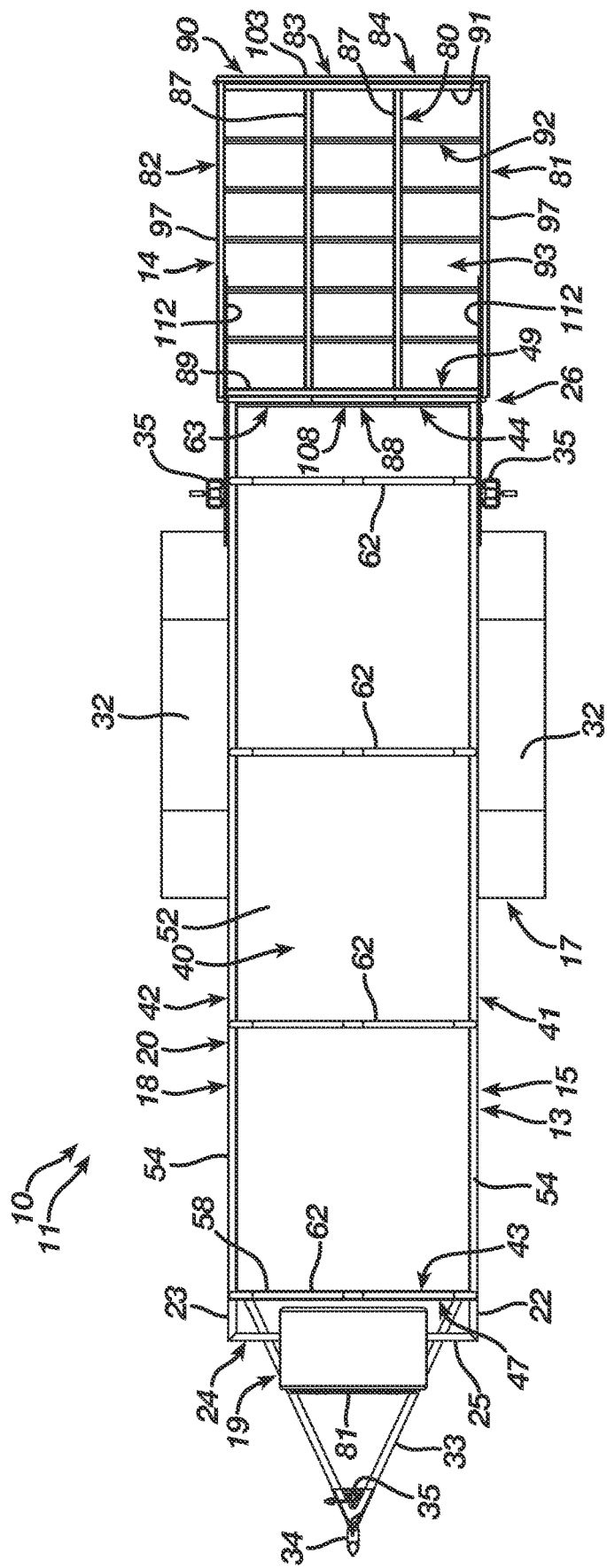
FIG. 4 is a top view illustrating the animal feeder according to the preferred embodiment in the feed transport position.
Figure 5:
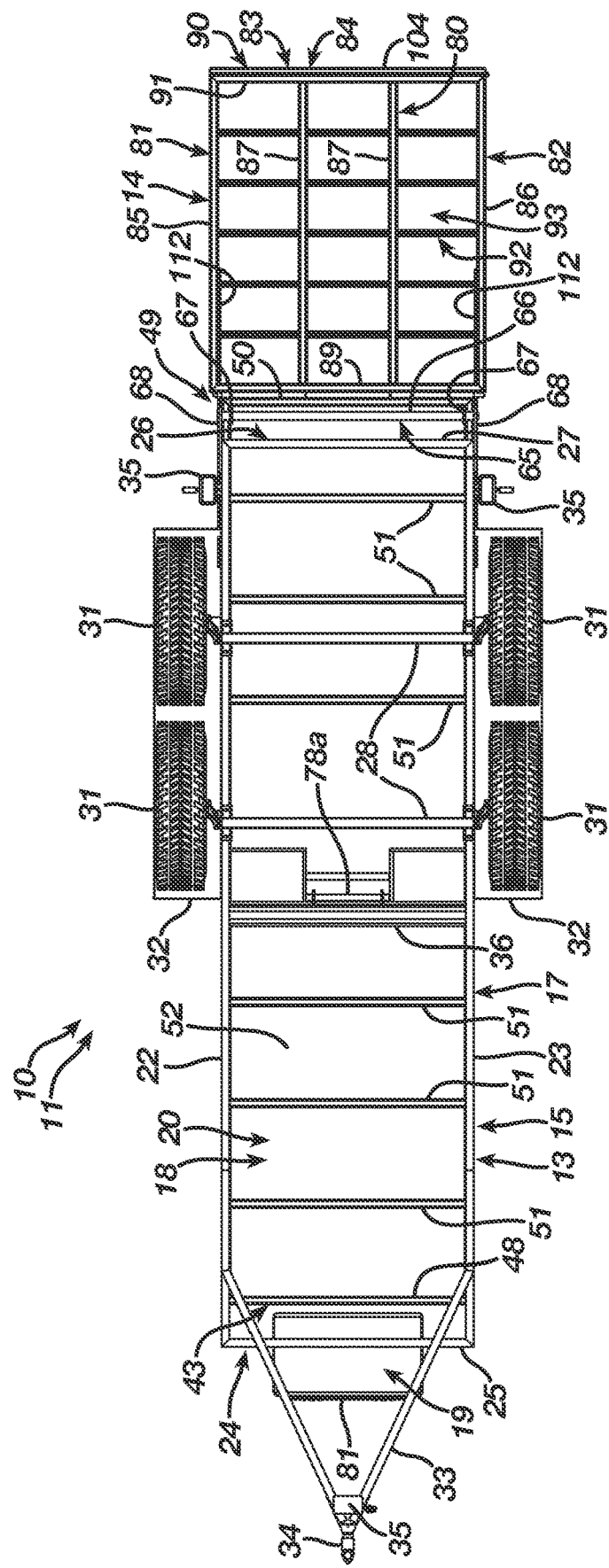
FIG. 5 is a bottom view illustrating the animal feeder according to the preferred embodiment in the feed transport position.
Figure 6:
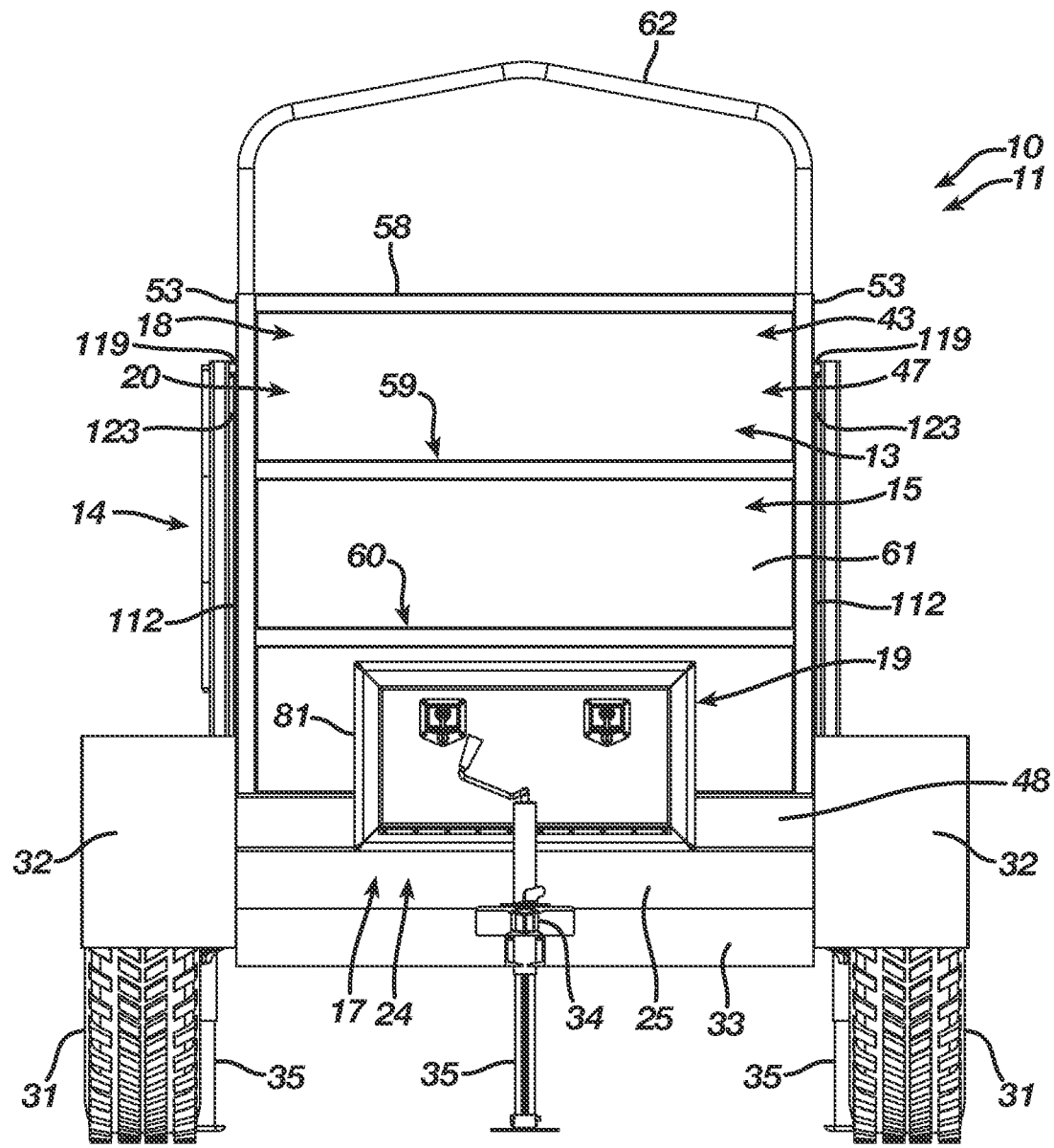
FIG. 6 is a front view illustrating the animal feeder according to the preferred embodiment in the feed transport position.
Figure 7:
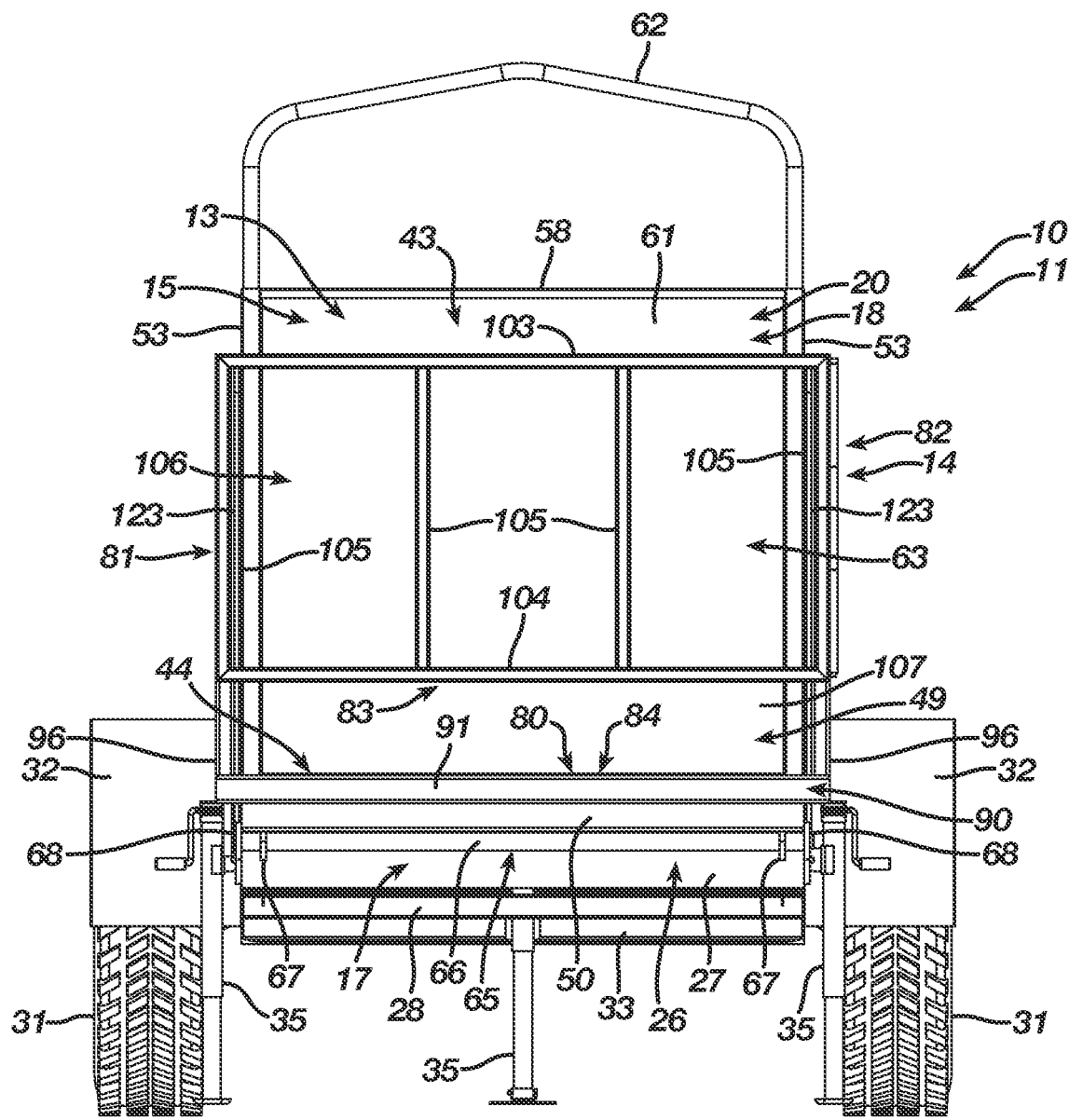
FIG. 7 is a side view illustrating the animal feeder according to the preferred embodiment in the feed transport position.
Figure 8:
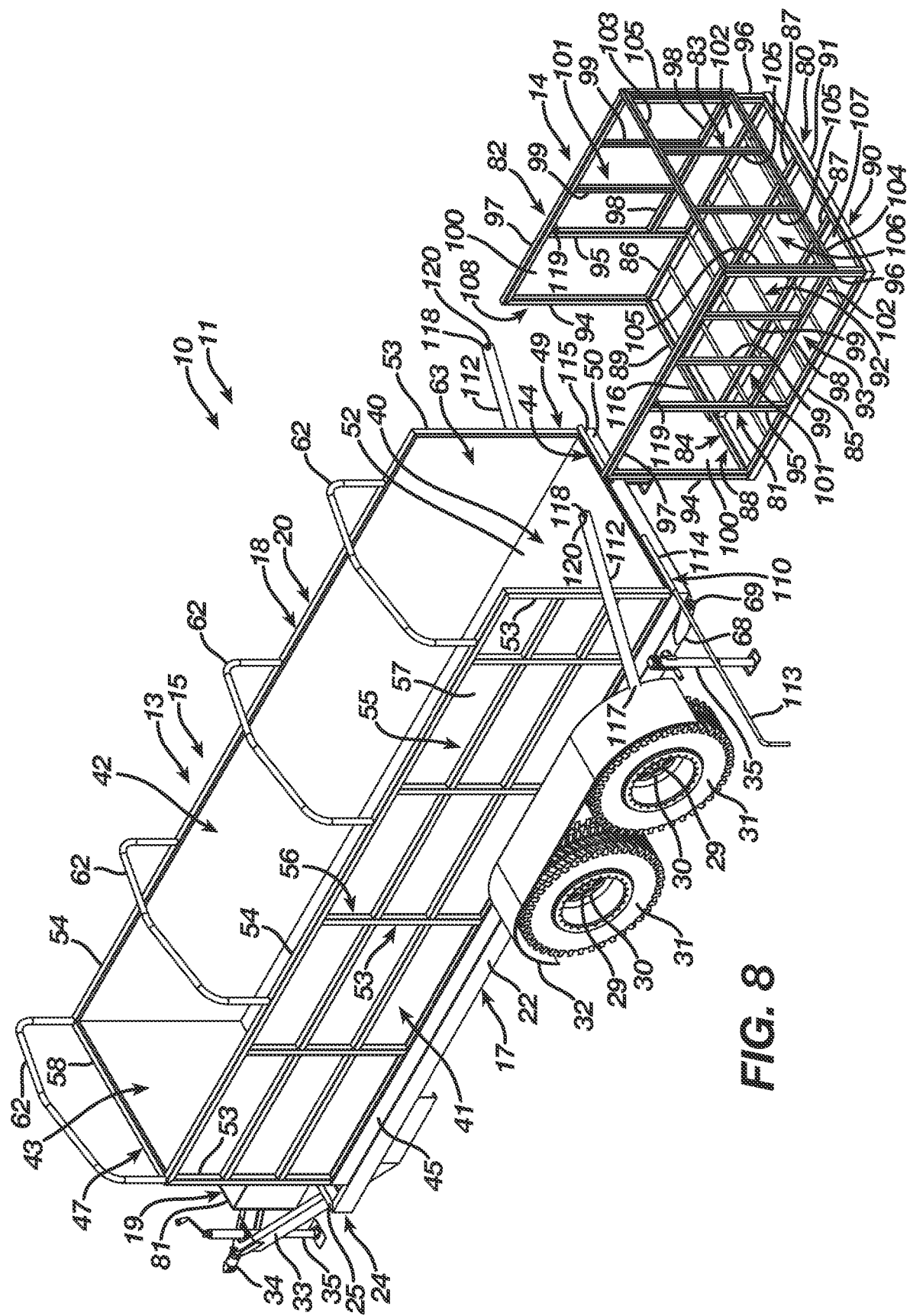
FIG. 8 is an exploded isometric view illustrating a dump trailer and a bunk of the animal feeder according to the preferred embodiment.
Figure 9:
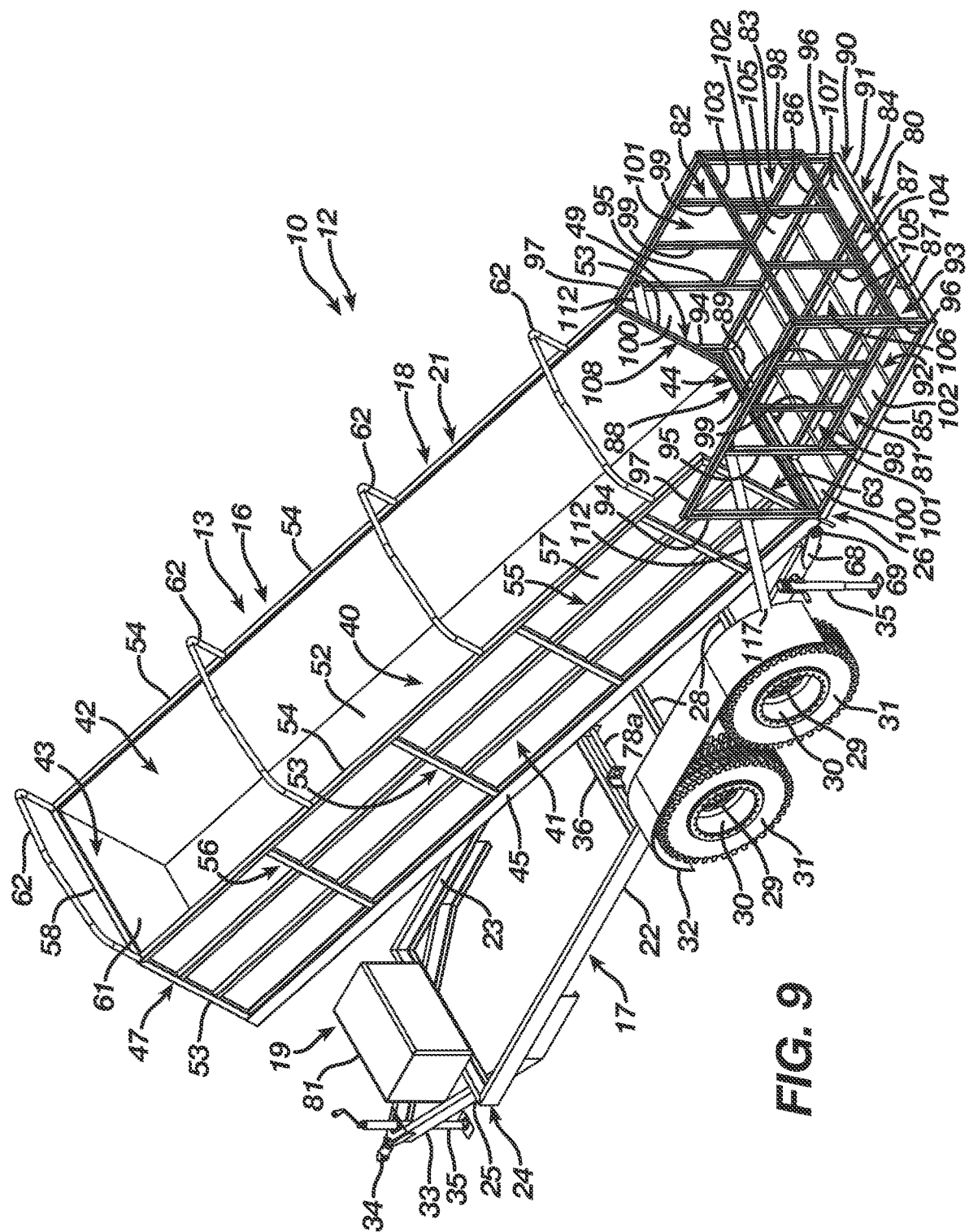
FIG. 9 is an isometric view illustrating the animal feeder according to the preferred embodiment in a feed delivery position.

As required, detailed embodiments of the present invention are disclosed herein; however, it is to be understood that the disclosed embodiments are merely exemplary of the invention, which may be embodied in various forms. Figures are not necessarily to scale, and some features may be exaggerated to show details of particular components or steps.

Referring to FIGS. 1-12, an animal feeder 10 according to a preferred embodiment includes a feed transport position 11 and a feed delivery position 12. The animal feeder 10 in the feed transport position 11 is configured for loading with animal feed, including but not limited to hay bales, followed by movement of the animal feeder 10 into an animal feed area, including but not limited to a pasture, that contains animals, including but not limited to livestock. Conversely, the animal feeder 10 in the feed delivery position 12 is configured to successively deliver animal feed to the animals.

The animal feeder 10 in the preferred embodiment includes a dump trailer 13 and a bunk 14 coupled therewith. The dump trailer 13 supports the bunk 14 while being pivotable relative thereto. The dump trailer 13 includes a lowered transport position 15 whereby the dump trailer 13 is configured to receive animal feed therein. The dump trailer 13 in the lowered transport position 15 further is configured to hook-up with a vehicle, including but not limited to a truck or tractor, such that the dump trailer and bunk coupled therewith are moveable into an animal feed area. The dump trailer 13 includes a raised delivery position 16 whereby the dump trailer 13 is configured to consecutively deliver animal feed into the bunk 14 for access by the animals in the animal feed area.

The dump trailer 13 in the preferred embodiment includes a frame 17 that supports a dump bed 18 while the dump bed 18 remains pivotable relative thereto and a lift system 19 that connects the dump bed 18 with the frame 17. The lift system 19 lowers the dump bed 18 to a lowered position 20 atop the frame 17 that places the dump trailer 13 in the lowered transport position 15. The lift system 19 further raises the dump bed 18 to a raised position 21 over the frame 17 that places the dump trailer 13 in the raised delivery position 16.

The frame 17 includes and the extents thereof are defined by side beams 22 and 23 secured at a front 24 by a front-end beam 25 and at a rear 26 by a rear end beam 27. The frame 17 includes an axle 28 that, in the preferred embodiment, is a tandem axle configured to receive at each end 29 thereof a rim 30 and tire 31 that supports the frame 17 and provides mobility thereof. The frame 17 includes a fender 32 connected to each of the side beams 22 and 23 above the tires 31 to supply the dump trailer 13 with a splash guard. The frame 17 at the front 24 includes a tongue 33 secured with the side beams 22 and 23 and the front-end beam 25. The tongue 33 includes a coupler 34 secured therewith that provides an attachment point for the dump trailer 13 with a vehicle. The frame 17 at the tongue 33 further includes a jack 35 used to support the dump trailer 13 at the front 24 when the dump trailer 13 is separated from a vehicle. Likewise, the frame 17 includes a jack 35 connected to each of the side beams 22 and 23 at the rear 26 used to support the dump trailer 13 at the rear 26 when the dump trailer 13 is separated from a vehicle. The frame 17 between the side beams 22 and 23 includes a crosspiece 36 that stabilizes the frame 17 and further provides a connection point for the lift system 19 with the frame 17. The frame 17 and the parts thereof as described above are assembled using suitable and known fastening members and means such as, for example, welding, nuts and bolts, screws, brackets, clamps, and the like.

The dump bed 18 includes and the extents thereof are defined by a floor 40 supporting sidewalls 41 and 42 and a front wall 43. The floor 40, which provides the dump bed 18 with a width 44, includes side beams 45 and 46 secured at a front 47 of the dump bed 18 by a front-end beam 48 and at a rear 49 of the dump bed 18 by a rear end beam 50. The floor 40 between the side beams 45 and 46 further includes crosspieces 51 that stabilize the floor 40 and further provide a support for a floor surface 52, which, in the preferred embodiment, may be a sheet or sheets comprised of metal or wood. The sidewall 41 includes posts 53, six in the preferred embodiment, secured to the side beams 45, a top rail 54 secured atop the posts 53, and crosspieces 55, ten in the preferred embodiment, secured between the posts 53 that form a wall frame 56 that provides an attachment point for a wall surface 57, which, in the preferred embodiment, may be a sheet or sheets comprised of metal or wood. Likewise, the sidewall 42 includes the posts 53, six in the preferred embodiment, secured to the side beams 46, the top rail 54 secured atop the posts 53, and crosspieces 55, ten in the preferred embodiment, secured between the posts 53 that form a wall frame 56 that provides an attachment point for a wall surface 57, which, in the preferred embodiment, may be a sheet or sheets comprised of metal or wood. The front wall 43 includes the posts 53 located at the front 47, a top rail 58 secured atop the posts 53, and crosspieces 59, two in the preferred embodiment, secured between the posts 53 that form a wall frame 60 that provides an attachment point for a wall surface 61, which, in the preferred embodiment, may be a sheet or sheets comprised of metal or wood. The dump bed 18 in the preferred embodiment includes crossmembers 62, four in the preferred embodiment, removably securable between the top rails 58 of the side beams 45 and 46 in order to allow a placement of a cover over the dump bed 18. While the floor 40, the sidewalls 41 and 42, and the front wall 43 in the preferred embodiment define the dump bed 18 configured to receive to receive animal feed therein, the dump bed 18 at the rear 49 does not include a rear wall and therefore is open such that the dump bed 18 includes an exit 63 for animal feed therefrom. Although the dump bed 18 at the rear 49 does not include a rear wall, the dump bed 18 may be supplied with a removable rear wall separable from the dump bed 18 at an animal feed area. The dump bed 18 and the parts thereof as described above are assembled using suitable and known fastening members and means such as, for example, welding, nuts and bolts, screws, brackets, clamps, and the like.

The frame 17 connects with and supports the dump bed 18 while the dump bed 18 remains pivotable relative thereto using a pivot assembly 65. The pivot assembly 65 includes a shaft 66 secured underneath the floor 40 adjacent the rear 49 of the dump bed 18 using a bracket 67 connected with each of the side beams 45 and 46. The pivot assembly 65 includes a pivot plate 68 connected with each of the side beams 22 and 23 adjacent the rear 26 of the frame 17 such that the pivot plate 68 extends past the rear 26 in order to position an aperture 69 thereof at the rear 49 of the dump bed 18. In accordance therewith, the shaft 66 respectively at each end inserts into the aperture 69 of each pivot plate 68 resulting in the pivot assembly 65 providing a pivotable connection between the dump bed 18 and the frame 17. The pivot plates 68 in each aperture 69 may include a bearing that reduces friction during a pivoting of the dump bed 18 relative to the frame 17. The pivot assembly 65 and the parts thereof as described above are assembled using suitable and known fastening members and means such as, for example, welding, nuts and bolts, screws, and the like.

Figure 10A:
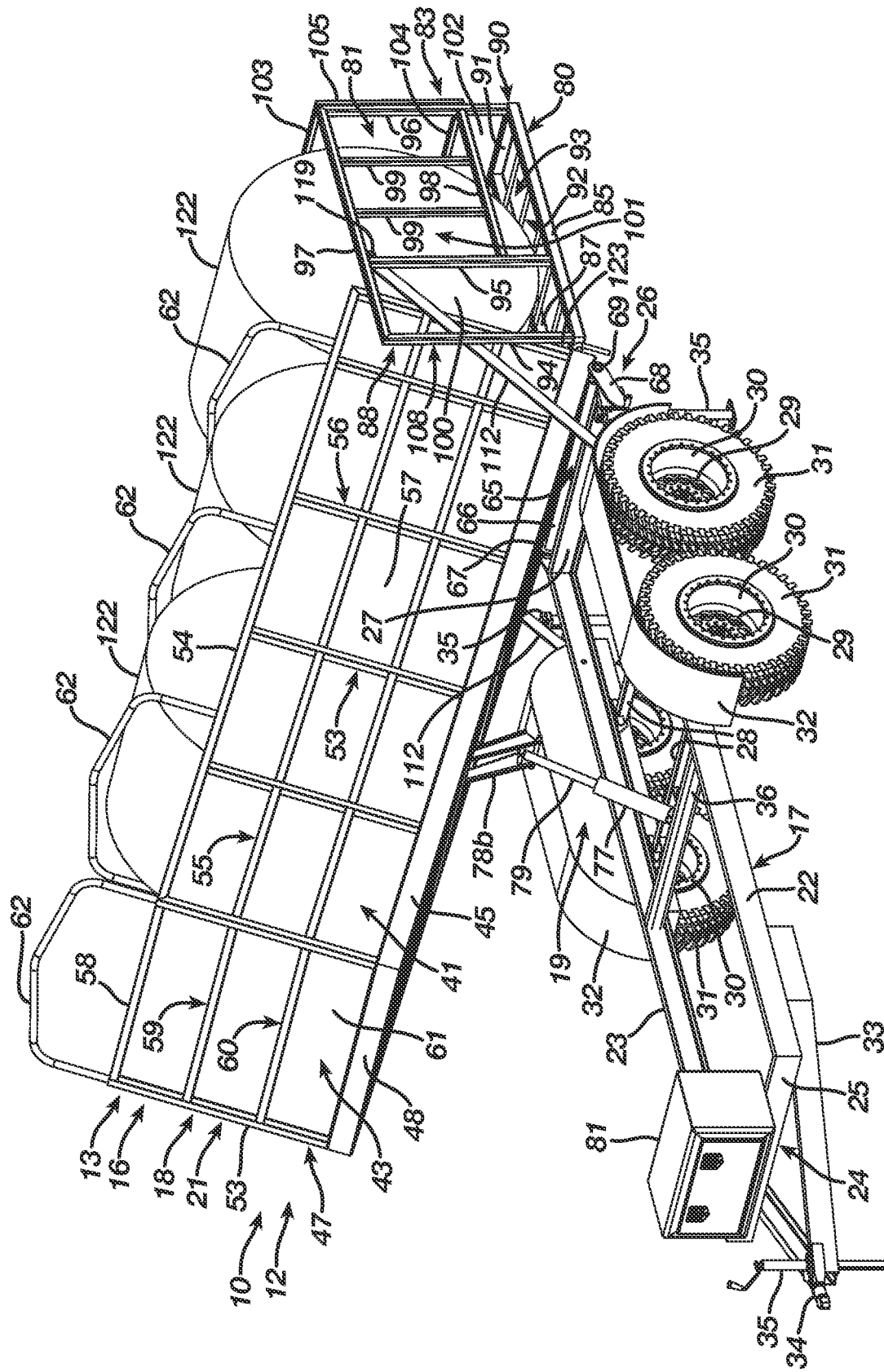
FIG. 10A is an isometric view illustrating a lift system for the dump trailer of the animal feeder according to the preferred embodiment.
Figure 10B:
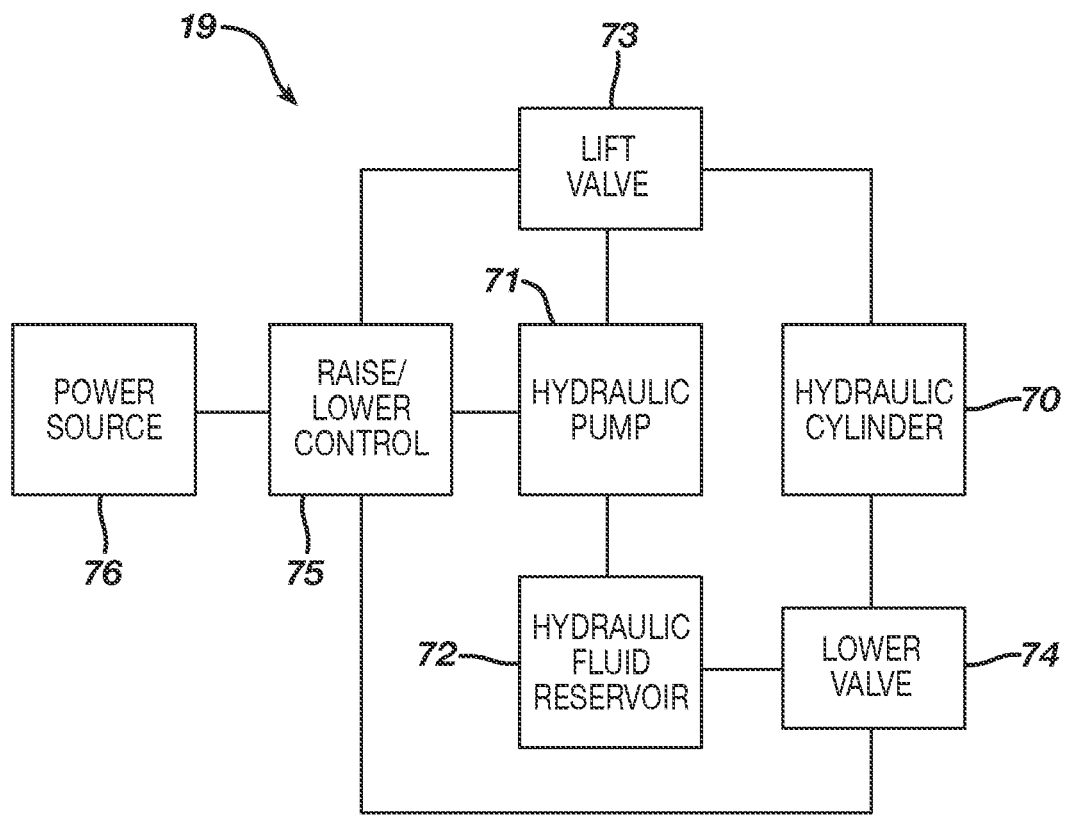
FIG. 10B is a schematic diagram illustrating the lift system for the dump trailer of the animal feeder according to the preferred embodiment.
Figure 11:
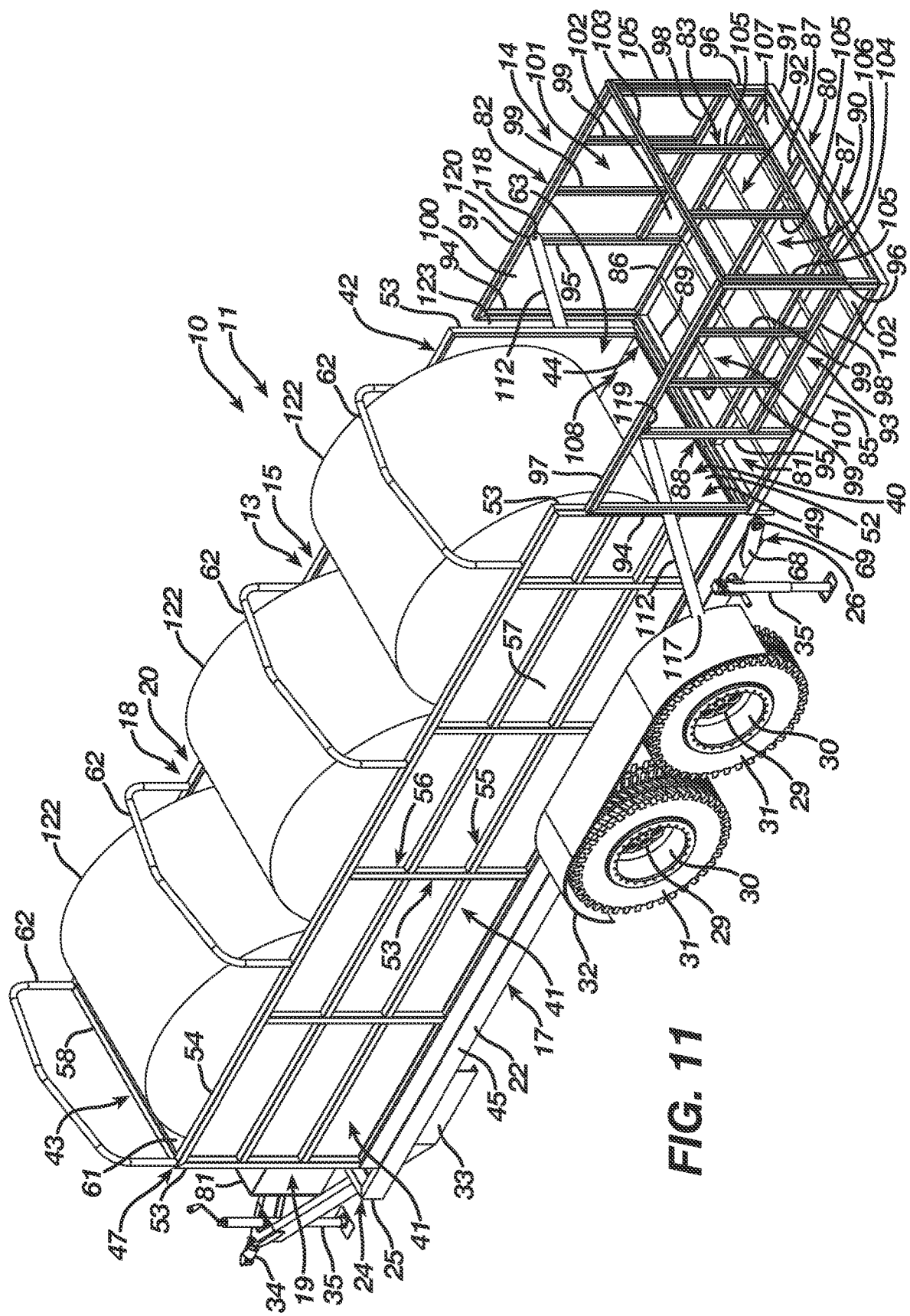
FIG. 11 is an isometric view illustrating feed in the animal feeder according to the preferred embodiment when in the feed transport position.
Figure 12:
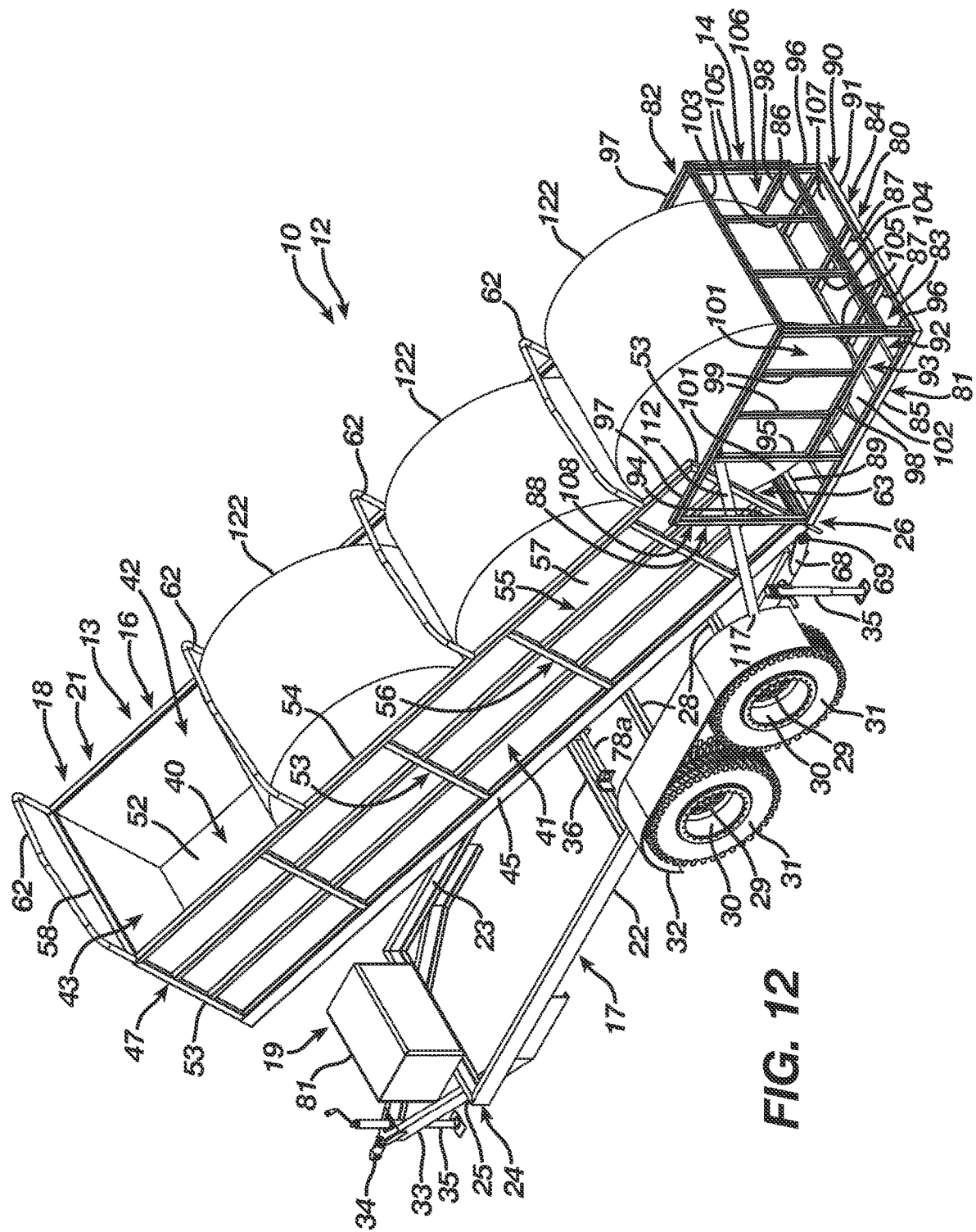
FIG. 12 is an isometric view illustrating feed in the animal feeder according to the preferred embodiment when in the feed delivery position.

The lift system 19, which connects the frame 17 and the dump bed 18, lowers the dump bed 18 to the lowered position 20 and raises the dump bed 18 to the raised position 21 as the dump bed 18 at the pivot assembly 65 pivots relative to the frame 17. Referring to FIGS. 10A-10B, the lift system 19 in the preferred embodiment includes a hydraulic cylinder 70, a hydraulic pump 71, a hydraulic fluid reservoir 72, a lift valve 73, a lower valve 74, a raise/lower control 75, and a power source 76. The hydraulic cylinder 70, which is a suitable and known hydraulic cylinder, connects at a barrel 77 thereof with a mounting bracket 78a fastened to the crosspiece 36 of the frame 17 thereby securing the hydraulic cylinder 70 with the frame 17. The hydraulic cylinder 70 connects at a piston 79 thereof with a mounting bracket 78b fastened to one of the crosspieces 51 of the floor 40 for the dump bed 18 thereby securing the hydraulic cylinder 70 with the dump bed 18. The hydraulic pump 71 connects with the hydraulic fluid reservoir 72 and with the hydraulic cylinder 70 through the lift valve 73 in order to deliver hydraulic fluid from the hydraulic fluid reservoir 72 and the hydraulic cylinder 70. The hydraulic cylinder 70 connects with the hydraulic fluid reservoir 72 through the lower valve 74. The hydraulic cylinder 70, the hydraulic pump 71, the hydraulic fluid reservoir 72, the lift valve 73, and the lower valve 74 are linked together using suitable and known hydraulic lines. The raise/lower control 75 connects with the power source 76 and further to each of the hydraulic pump 71, the lift valve 73, and the lower valve 74 to control power delivery to the hydraulic pump 71, the lift valve 73, and the lower valve 74. The raise/lower control 75 in the preferred embodiment includes a suitable and known raise push button switch and a suitable and known lower push button switch, whereas the power source 76 in the preferred embodiment is a suitable and known battery. The raise/lower control 75, the power source 76, the hydraulic pump 71, the lift valve 73, and the lower valve 74 are linked together using suitable and known electrical lines. In the preferred embodiment, the hydraulic pump 71, the hydraulic fluid reservoir 72, the lift valve 73, the lower valve 74, the raise/lower control 75, and the power source 76 of the lift system 17 are housed in a hydraulic lift box 81 mounted to the frame 17 at the front-end beam 25 thereof.

During operation of the lift system 19 wherein the dump bed 18 initially resides in the lowered position 20, an activation of the raise/lower control 75, such as, for example, through a pushing of the raise push button switch, supplies power to the hydraulic pump 71 and the lift valve 73. The lift valve 73, which in the preferred embodiment is a normally closed solenoid valve, opens to permit the hydraulic pump 71 to pump hydraulic fluid from the hydraulic fluid reservoir 72 to the hydraulic cylinder 70. Responsive thereto, the hydraulic cylinder 70 extends thereby lifting the dump bed 18, resulting in the dump bed 18 at the pivot assembly 65 pivoting relative to the frame 17 such that the dump bed rises over the frame 17 to the raised position 21 that places the dump trailer 13 in the raised delivery position 16. Once the dump bed 18 reaches the raised position 21, a deactivation of the raise/lower control 75, such as, for example, through a release of the raise push button switch, turns off the hydraulic pump 71 and closes the lift valve 73.

Conversely, when the dump bed 18 resides in the raised position 21, an activation of the raise/lower control 75, such as, for example, through a pushing of the lower push button switch, supplies power to the lower valve 74. The lower valve 74, which in the preferred embodiment is a normally closed solenoid valve, opens to permit hydraulic fluid flow from to the hydraulic cylinder 70 to the hydraulic fluid reservoir 72. More particularly, the hydraulic cylinder 70, due to the weight of the raised dump bed 18, retracts as hydraulic fluid flows therefrom thereby lowering the dump bed 18, resulting in the dump bed 18 at the pivot assembly 65 pivoting relative to the frame 17 such that the dump bed 18 lowers atop the frame 17 to the lowered position 20 that places the dump trailer 13 in the lowered transport position 15. Once the dump bed 18 reaches the lowered position 20, a deactivation of the raise/lower control 75, such as, for example, through a release of the lower push button, closes the lift valve 73.

The bunk 14 connects with the frame 17 and with the dump bed 18 while the dump bed 18 remains pivotable relative to the bunk 14. The bunk 14 includes and the extents thereof are defined by a floor 80 supporting sidewalls 81 and 82 and an end wall 83. The floor 80, which provides the bunk 14 with a width 84 that is greater than the width 44 of the dump bed 18, includes side support beams 85 and 86 and inner support beams 87, two in the preferred embodiment. The side support beams 85 and 86 and the inner support beams 87 are secured at a front 88 of the bunk 14 by a front-end beam 89 and at a rear 90 of the bunk 14 by a rear end beam 91. The floor 80 between the side support beam 85, the inner support beams 87, and the side support beam 86 includes crosspieces 92, fifteen in the preferred embodiment, that stabilize the floor 80 and further define apertures 93 configured to allow left-over animal feed to be removed from the bunk 14. The sidewalls 81 and 82 each include a front post 94, an inner post 95, and a rear post 96 secured to the side support beams 85 and 86 and a top rail 97 secured atop the front, inner, and rear posts 94-96. The sidewalls 81 and 82 each include a crosspiece 98 secured between the inner post 95 and the rear post 96 and uprights 99 secured between the top rail 97 and the crosspiece 98. The inner post 95, the crosspiece 98, and the uprights 99 are located during construction of the sidewalls 81 and 82 to define apertures 100, 101, and 102 in the sidewalls 81 and 82 of varying size, shape, and position such that the bunk 18 provides animals with different access points to animal feed contained therein. The end wall 83 secures with both rear posts 96 and includes a top rail 103, a crosspiece 104, and uprights 105, two outer uprights 105 and two inner uprights 105 in the preferred embodiment, secured between the top rail 103 and the crosspiece 104. The end wall 83 in the preferred embodiment secures with the rear posts 96 at the outer uprights 105. The crosspiece 104 and the uprights 105 are located during construction of the end wall 83 to define apertures 106 and 107 in the end wall 83 of varying size, shape, and position such that the bunk 18 provides animals with different access points to animal feed contained therein. While the floor 80, the sidewalls 81 and 82, and the end wall 83 in the preferred embodiment define the bunk 14 configured to hold animal feed therein, the bunk 14 at the front 84 thereof does not include a front wall and therefore is open such that the bunk 14 includes an entrance 108 for animal feed delivered from the dump trailer 13 and more particularly from the dump bed 18. Although the bunk 14 at the front 84 does not include a front wall, the bunk 14 may be supplied with a removable front wall separable from the bunk 14 at an animal feed area. The bunk 14 and the parts thereof as described above are assembled using suitable and known fastening members and means such as, for example, welding, nuts and bolts, screws, and the like.

The bunk 14 connects with the dump bed 18 while the dump bed 18 remains pivotable relative to the bunk 14 using a hinge 110. The hinge 110 includes a pin 113, a barrel 114 secured with the rear end beam 50 of the dump bed 18 adjacent the side beam 22, a barrel 115 secured with the rear end beam 50 of the dump bed 18 adjacent the side beam 23, and a barrel 116 secured with the front-end beam 89 of the bunk 14. The barrel 116 is located centrally with respect to the front-end beam 89 such that the barrel 116 inserts between the barrels 114 and 115 in alignment therewith when the front-end beam 89 of the bunk 14 is placed adjacent the rear end beam 50 of the dump bed 18. In accordance therewith, the barrels 114-116 due to their alignment define a passage that receives the pin 113 therethrough thereby forming the hinge 112 and coupling the bunk 14 with the dump bed 18 whereby the dump bed 18 due to the hinge 112 remains pivotable relative to the bunk 14. Although the hinge 112 includes the barrels 114-116, the hinge 112 may be formed through a first barrel connected to the rear end beam 50 of the dump bed 18 and a second barrel connected with the front-end beam 89 of the bunk 14. The hinge 112 and the parts thereof as described above are assembled and secured using suitable and known fastening means such as, for example, welding and the like.

The bunk 14, due to the pivotable connection thereof with the dump bed 18, further connects with the frame 17 using braces 112 in order to maintain the bunk 14 suspended at the rear 49 of the dump bed 18 in an orientation level with respect to the frame 17 and thus off the ground of an animal feed area. The braces 112 each secure at a first end 117 with the frame 17 at any suitable part thereof that permits extension of the braces 114 to the bunk 14. Example securing points for the braces 112 at the first ends 117 thereof include respectively the side beams 22 and 23. Nevertheless, the braces 112 in the preferred embodiment secure respectively at the first ends 117 thereof with the fenders 32 of the frame 17 using suitable and known fastening means such as, for example, welding and the like. The securing of the braces 112 respectively at the first ends 117 thereof with the fenders 32 of the frame 17 positions the braces 112 at second ends 118 thereof beyond the rear 49 of the dump bed 18 adjacent respectively the sidewalls 81 and 82 of the bunk 14. The braces 112 in the preferred embodiment, due to the width 84 of the bunk 14 being greater than the width 44 of the dump bed 18, extend respectively from the frame 17 between the dump bed 18 and the bunk 14 to a location interior of the sidewalls 81 and 82. The braces 112 at the second ends 118 secure with the bunk 14 at any suitable part thereof that allows the braces 112 to support the bunk 14 suspended at the rear 49 of the dump bed 18. Illustratively, in the preferred embodiment, spacers 119 connected respectively to the bunk 14 at the inner post 95 and the top rail 97 of the sidewalls 81 and 82, using suitable and known fastening means such as, for example, welding and the like, permit a securing of the braces 112 respectively with the sidewalls 81 and 82. The braces 112 respectively align with the spacers 119 at openings 120 in the second ends 118 thereof whereby suitable and known fastening members such as, for example, nuts and bolts or pins, secure the braces 112 with the spacers 119 and thus with the sidewalls 81 and 82 of the bunk 14 thereby maintaining the bunk 14 lifted off the ground of an animal feed area. In the preferred embodiment, the connections of the bunk 14 with the dump bed 18 at the hinge 110 and with the second ends 118 of the braces 112 at the spacers 119 are removable such that the bunk 14 disconnects from the dump trailer 13 in order to provide easier access to the dump bed 18.

Use of the animal feeder 10 to deliver animal feed, such as, for example, hay bales 122, to animals in an animal feed area begins with a loading of the animal feeder 10 in the feed transport position 11 with the hay bales 122, three in the preferred embodiment. More particularly, the dump trailer 13 in the lowered transport position 15 with the dump bed 18 thereof in the lowered position 20 is loaded with the hay bales 122. Loading of the dump bed 18 with the hay bales 122 includes feeding the hay bales 122 sequentially over the bunk 14 and into the dump bed 18 via the exit 63 thereof. The bunk 14 may be removed from the rear 49 of the bunk 14 in order to provide easier access to the dump bed 18. Alternatively, a removal of the crossmembers 62 allows a loading of the dump bed 18 from over one of the sidewalls 41 and 42. Once loaded in the dump bed 18, the hay bales 122 may be tied down to prevent premature movement of the hay bales 122 into the bunk 14.

The animal feeder 10, which resides in the feed transport position 11, connects with a vehicle using the coupler 34 disposed at the end of the tongue 33 of the frame 17. After moving the animal feeder 10 into an animal feed area, the jacks 35 are lowered followed by a disconnection of the animal feeder 10 from the vehicle. Activation of the lift system 19, as previously described, operates the hydraulic cylinder 70 thereof to lift the dump bed 18, which pivots at the pivot assembly 65 relative to the frame 17, until the dump bed 18 reaches the raised position 21 that places the dump trailer 13 in the raised delivery position 16 and the animal feeder 10 in the feed delivery position 12. As the lift system 19 lifts the dump bed 18 and the dump bed 18 pivots relative to the frame 17 into the raised position 21, the dump bed 18 further pivots at the hinge 110 relative to the bunk 14 whereby the dump bed 18 at the rear 49 thereof enters the bunk 14 at the front 88 thereof, resulting in the dump bed 18 at the exit 63 thereof communicating with the bunk 14 at the entrance 108 thereof. The dump bed 18 at the rear 49 thereof enters the bunk 14 at the front 88 thereof while pivoting relative to the bunk 14 on the basis the bunk 14 includes a width 84 that is greater than the width 44 of the dump bed 18. In accordance therewith, the sidewalls 41 and 42 of the dump bed 18 reside interior of the sidewalls 81 and 82 of the bunk 14 such that gaps 123 exist respectively between the sidewalls 41 and 42 of the dump bed 18 and the sidewalls 81 and 82 of the bunk 14. During raising of the dump bed 18 from the lowered position 20 to the raised position 21 and the corresponding pivoting of the dump bed 18 relative to the bunk 14 at the hinge 110, the dump bed 18 at the sidewalls 41 and 42 located at the rear 49 of the dump bed 18, due to the gaps 123, enters the bunk 14 at the sidewalls 81 and 82 located at the front 88 of the bunk 14 such that the dump bed 18 at the exit 63 thereof communicates with the bunk 14 at the entrance 108 thereof. With the dump bed 18 raised to the raised position 21 while the dump bed 18 at the exit 63 communicates with the bunk 14 at the entrance 108, the dump bed 18 delivers into the bunk 14 via gravity the hay bale 122 adjacent the entrance 108 of the bunk 14.

As an illustration, upon the raising of the dump bed 18 to the raised position 21 when the dump bed 18 includes three hay bales 122, the hay bale 122 adjacent the entrance 108 of bunk 14 enters the bunk 14 from the dump bed 18 via gravity while the two remaining hay bales 122 via gravity move toward the exit 63 of the dump bed 14. The hay bale 122 within the bunk 14 is now accessible to animals in the animal feed area through the apertures 100, 101, and 102 in the sidewalls 81 and 82 and the apertures 106 and 107 in the end wall 83. Once the animals consume the hay comprising the hay bale 122 in the bunk 14 including any hay exiting the bunk 14 via the apertures 93 in the floor 80, the next hay bale 122 adjacent the entrance 108 of bunk 14 enters the bunk 14 from the dump bed 18 via gravity while the one remaining hay bale 122 via gravity moves toward the exit 63 of the dump bed 14. After consumption of the second hay bale 122, the final hay bale 122 adjacent the entrance 108 of bunk 14 enters the bunk 14 from the dump bed 18 via gravity. In accordance with the dump bed 18 being in the raised position 21 with the exit 63 thereof communicating with the bunk 14 at the entrance 108 thereof, the animal feeder 10 in the feed delivery position 12 with the dump trailer 13 in the raised delivery position 16 and the dump bed in the raised position 21 consecutively delivers the hay bales 122 into the bunk 14 for access by the animals in the animal feed area.

After consumption of the hay bales 122 loaded within the animal feeder 10, activation of the lift system 19, as previously described, operates the hydraulic cylinder 70 thereof to lower the dump bed 18, which pivots at the pivot assembly 65 relative to the frame 17, until the dump bed 18 lowers atop the frame 17 thereby reaching the lowered position 20 that places the dump trailer 13 in the lowered transport position 15 and the animal feeder 10 in the feed transport position 11. The animal feeder 10 connects with a vehicle using the coupler 34 disposed at the end of the tongue 33 of the frame 17 followed by a raising of the jacks 35. The animal feeder 10 then is returned to a hay bale 122 storage area for reloading with hay bales 122.

While the dump trailer 13 and in particular the dump bed 18 in the preferred embodiment are shown and described as holding three hay bales 122, the number of hay bales 122 may increase or decrease dependent upon the sizes of the hay bales 122. Moreover, the configuration of the dump trailer 13 and in particular the dump bed 18 with respect to size may be increased in order to increase the number of hay bales 122 held within the dump bed 18. Illustratively, the length and/or the width of the dump bed 18 may be increased such that the dump bed 18 holds an increased number of hay bales 122. An increase in the width of the dump bed 18 would include a corresponding increase in the width of the bunk 14 whereby the bunk 14 would hold adjacent hay bales 122. If found to be desirable, the size of the dump bed 18 may be decreased to hold two hay bales 122.

Figure 13:
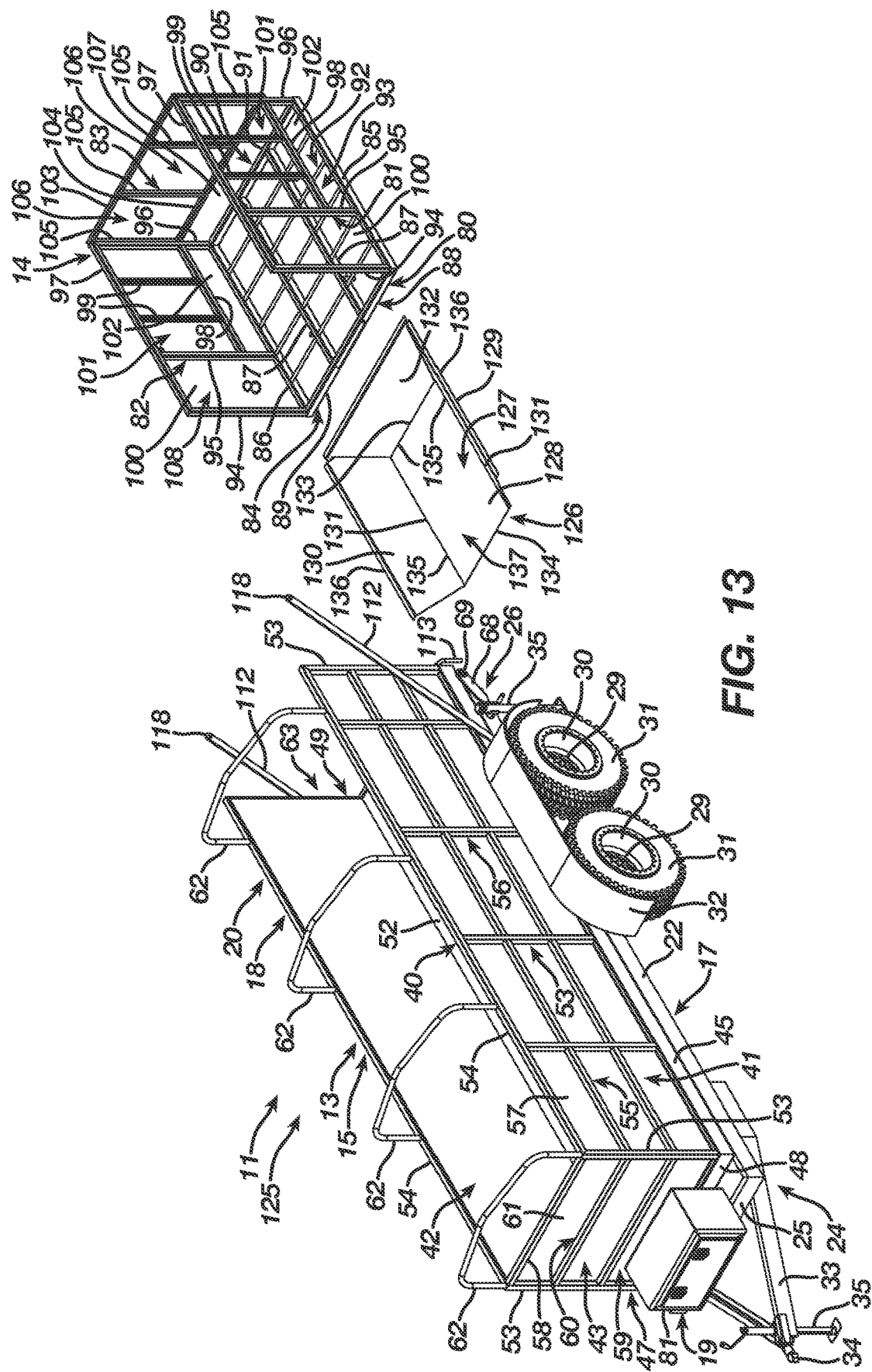
FIG. 13 is an exploded isometric view illustrating a feed container insertable into the bunk to produce an animal feeder according to an alternative of the preferred embodiment.
Figure 14:
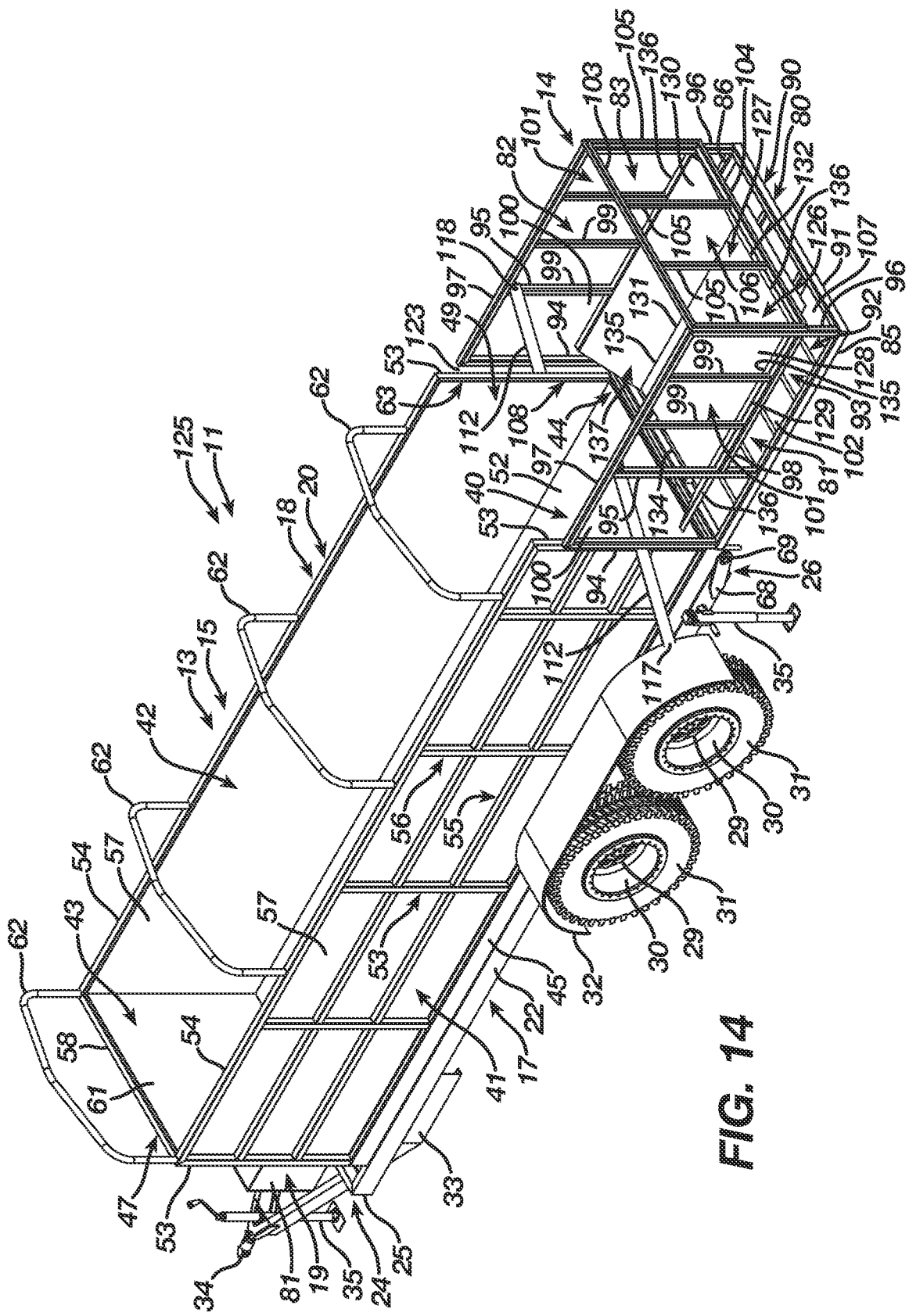
FIG. 14 is an isometric view illustrating the animal feeder according to the alternative of the preferred embodiment in a feed transport position.
Figure 15:
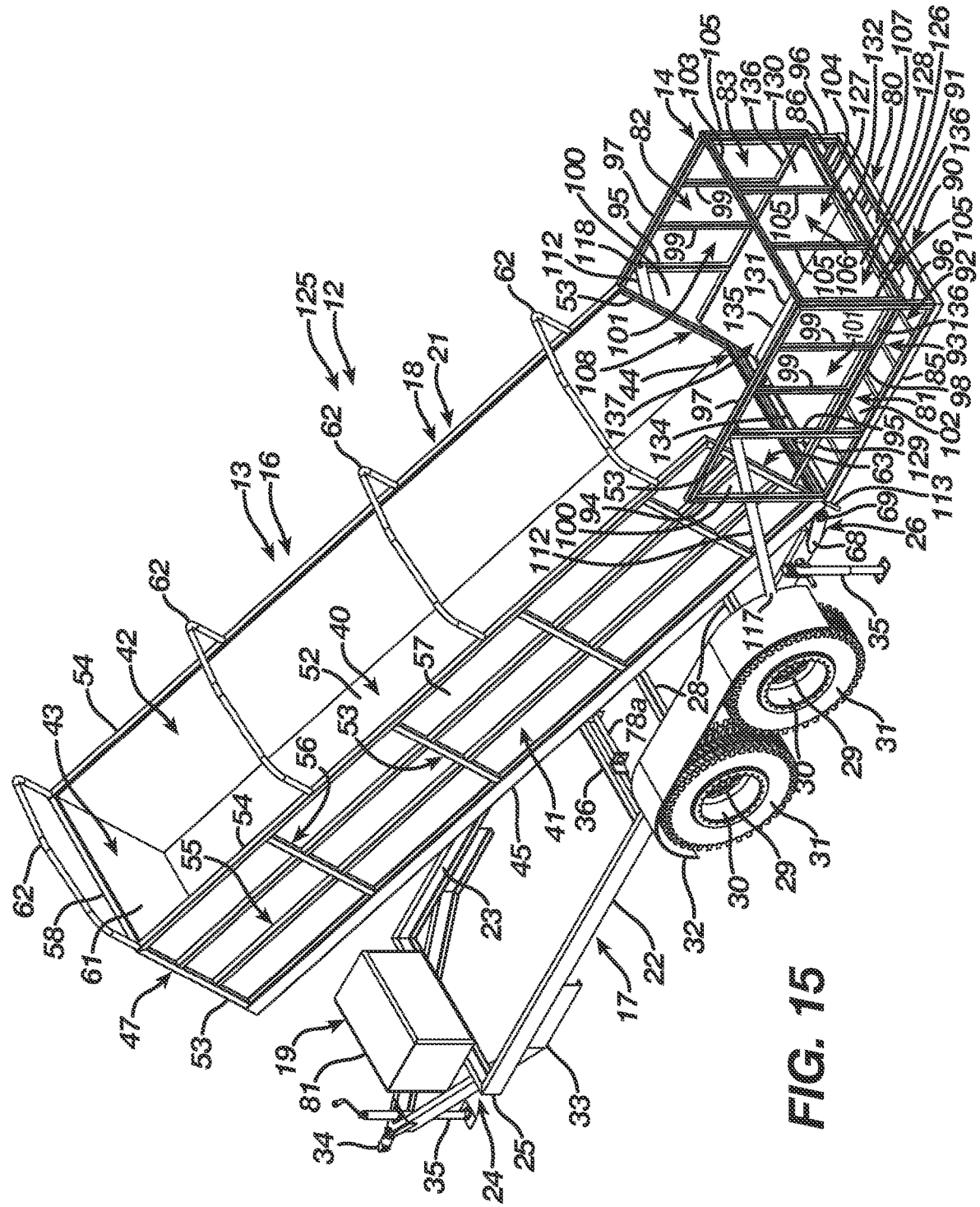
FIG. 15 is an isometric view illustrating the animal feeder according to the alternative of the preferred embodiment in a feed delivery position.

Referring to FIGS. 13-15, an animal feeder 125 according to an alternative of the preferred embodiment includes a feed container 126 that integrates with the animal feeder 110 to provide the animal feeder 110 with the capability to deliver discrete animal feed, including but not limited to grains and seeds such as cottonseeds. The animal feeder 125 is substantially identical in design and operation relative to the animal feeder 10 according to the preferred embodiment such that, for the sake of brevity, only differences therebetween will be described herein. Moreover, one of ordinary skill in the art will recognize that like parts of the animal feeder 125 labeled with like numerals of the animal feeder 10 incorporate a design and function as previously set forth in the detailed description of the animal feeder 10.

The feed container 126 in the alternative of the preferred embodiment fits within the bunk 14 and integrates therewith while defining a continuous interior surface 127 that provides the feed container 126 with the capability of holding discrete animal feed. The feed container 126 includes and the extents thereof are defined by a floor 128 supporting sidewalls 129 and 130 at sides 131 and an end wall 132 at a rear 133 opposite to a front 134. While the sidewalls 129 and 130 and the end wall 132 may be oriented at right angles relative to the floor 128, the sidewalls 129 and 130 and the end wall 132 in the alternative embodiment angle away from the floor 128 and are oriented obtuse angles 135 relative to the floor 128 in order to increase a carrying capacity of the feed container 126. The feed container 126 in the alternative embodiment is sized according to a width between the sidewalls 129 and 130 and a length between the front 134 and the end wall 132 to fit within the bunk 14 while contacting the sidewalls 81 and 82 and the end wall 83 of the bunk 14. The sidewalls 129 and 130 and the end wall 132 in the alternative embodiment respectively rise from the floor 128 to a position adjacent the crosspieces 98 and 104 of the bunk 14 such that access to discrete animal feed within the feed container 126 occurs through the apertures 100, 101, and 106. upper apertures. The sidewalls 129 and 130 and the end wall 132 each include a lip 136 that supplies the feed container 126 with a blunt surface where animals access the feed container 126. While the floor 128, the sidewalls 129 and 130, and the end wall 132 in the alternative embodiment define the feed container 126 configured to hold discrete animal feed therein, the feed container 126 at the front 134 thereof does not include a front wall and therefore is open such that the feed container 126 includes an entrance 137 for discrete animal feed delivered from the dump trailer 13 and more particularly from the dump bed 18. In the alternative embodiment, the floor 128, the sidewalls 129 and 130, and the end wall 132 of the feed container 126 as described above may be a sheet or sheets comprised of metal or wood assembled using suitable and known fastening members and means such as, for example, welding, nuts and bolts, screws, and the like.

Use of the animal feeder 125 to deliver discrete animal feed to animals in an animal feed area begins with inserting the feed container 126 within bunk 14. After incorporating the feed container 126 within bunk 14, the animal feeder 125 in the feed transport position 11 is loaded with discrete animal feed. More particularly, the dump trailer 13 in the lowered transport position 15 with the dump bed 18 thereof in the lowered position 20 is loaded with the discrete animal feed. Loading of the dump bed 18 with discrete animal feed includes removing the crossmembers 62 followed by a loading of the dump bed 18 with discrete animal feed from over one of the sidewalls 41 and 42.

The animal feeder 125, which resides in the feed transport position 11, connects with a vehicle using the coupler 34 disposed at the end of the tongue 33 of the frame 17. After moving the animal feeder 125 into an animal feed area, the jacks 35 are lowered followed by a disconnection of the animal feeder 125 from the vehicle. Activation of the lift system 19, as previously described, operates the hydraulic cylinder 70 thereof to lift the dump bed 18, which pivots at the pivot assembly 65 relative to the frame 17, until the dump bed 18 reaches the raised position 21 that places the dump trailer 13 in the raised delivery position 16 and the animal feeder 125 in the feed delivery position 12. As the lift system 19 lifts the dump bed 18 and the dump bed 18 pivots relative to the frame 17 into the raised position 21, the dump bed 18 further pivots at the hinge 110 relative to the bunk 14 whereby the dump bed 18 at the rear 49 thereof enters the bunk 14 at the front 88 thereof, resulting in the dump bed 18 at the exit 63 thereof communicating with the feed container 126 at the entrance 137 thereof. With the dump bed 18 raised to the raised position 21 while the dump bed 18 at the exit 63 communicates with the feed container 126 at the entrance 137, the dump bed 18 delivers into the feed container 126 via gravity discrete animal feed until the feed container 126 fills with the discrete animal feed. As the animals consume the discrete animal feed in the feed container 126, the dump bed 18 via gravity continues to refill the feed container 126 until depletion of the discrete animal feed held within the dump bed 18. In accordance with the dump bed 18 being in the raised position 21 with the exit 63 thereof communicating with the feed container 126 at the entrance 137 thereof, the animal feeder 125 in the feed delivery position 12 with the dump trailer 13 in the raised delivery position 16 and the dump bed in the raised position 21 successively delivers discrete animal feed into the feed container 126 for access by the animals in the animal feed area.

After consumption of the discrete animal feed loaded within the animal feeder 125, activation of the lift system 19, as previously described, operates the hydraulic cylinder 70 thereof to lower the dump bed 18, which pivots at the pivot assembly 65 relative to the frame 17, until the dump bed 18 lowers atop the frame 17 thereby reaching the lowered position 20 that places the dump trailer 13 in the lowered transport position 15 and the animal feeder 125 in the feed transport position 11. The animal feeder 125 connects with a vehicle using the coupler 34 disposed at the end of the tongue 33 of the frame 17 followed by a raising of the jacks 35. The animal feeder 125 then is returned to a hay bale 122 storage area for reloading with hay bales 122.

Although the present invention has been described in terms of the foregoing embodiment, such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing description; rather, it is defined only by the claims that follow.

What is claimed:

1. An animal feeder moveable between a feed transport position and a feed delivery position that successively delivers animal feed contained within the animal feeder, comprising:
    a bunk;
    a dump trailer adapted to hold animal feed therein, the dump trailer including a lowered transport position that locates the animal feeder in the feed transport position and a raised delivery position that locates the animal feeder in the feed delivery position, the dump trailer configured to support the bunk at a rear thereof, the dump trailer further being pivotable relative to the bunk, whereby the dump trailer, when moved from the feed transport position to the raised delivery position, pivots relative to the bunk such that the dump trailer at an exit thereof communicates with the bunk at an entrance thereof, further whereby the dump trailer in the raised delivery position successively delivers animal feed held therein into the bunk for access by animals.

2. The animal feeder of claim 1, wherein, upon animals consuming the animal feed within the bunk, the dump trailer re-delivers the animal feed held therein into the bunk for access by animals until depletion of the animal feed held within the dump trailer.

3. The animal feeder of claim 1, the dump trailer, comprising:
    a dump bed having a width, the dump bed adapted to hold animal feed therein, the dump bed further including a floor supporting sidewalls and a front wall, whereby the floor and the sidewalls at a rear of the dump bed define an exit from the dump bed that forms the exit for animal feed from the dump trailer;
    a frame configured to support the dump bed, the dump bed being pivotable relative to the frame; and
    a lift system connecting the dump bed with the frame, the lift system being configured to lower the dump bed to a lowered position such that the dump bed pivots atop the frame thereby placing the dump trailer in the lowered transport position, the lift system further being configured to raise the dump bed to a raised position such that the dump bed pivots over the frame thereby placing the dump trailer in the raised delivery position.

4. The animal feeder of claim 3, wherein:
    the bunk rigidly connects with the frame; and
    the bunk connects with the dump bed at the rear of the dump bed adjacent the exit of the dump bed, the dump bed being pivotable relative to the bunk, whereby, when the lift system moves the dump bed from the lowered position to the raised position, the dump bed pivots relative to the bunk such that the dump bed at the exit thereof communicates with the bunk at the entrance thereof, further whereby the dump bed in the raised position successively delivers animal feed held therein into the bunk for access by animals.

5. The animal feeder of claim 4, wherein, upon animals consuming the animal feed within the bunk, the dump bed re-delivers the animal feed held therein into the bunk for access by animals until depletion of the animal feed held within the dump bed.

6. The animal feeder of claim 4, the bunk having a width greater than the width of the dump bed, the bunk adapted to hold animal feed therein delivered from the dump bed, the bunk further including a floor supporting sidewalls and an end wall, whereby the floor and the sidewalls at a front of the bunk define the entrance of the bunk, further whereby the sidewalls and the end wall include apertures that provide animals access to animal feed held within the bunk.

7. The animal feeder of claim 6, the floor of the bunk defining apertures configured to allow removal of left-over animal feed from the bunk.

8. The animal feeder of claim 6, wherein the sidewalls of the dump bed, due to the width of the bunk being greater than the width of the dump bed, reside interior to the sidewalls of the bunk, whereby, when the lift system moves the dump bed from the lowered position to the raised position while the dump bed pivots relative to the bunk, the dump bed at the sidewalls located at the rear of the dump bed enters the bunk at the sidewalls located at the front of the bunk such that the dump bed at the exit thereof communicates with the bunk at the entrance thereof, further whereby the dump bed in the raised position successively delivers animal feed held therein into the bunk for access by animals.

9. The animal feeder of claim 6, wherein:
the floor of the bunk comprises:
  side support beams and at least one inner support beam secured between a front- end beam and a rear end beam, and
  a plurality of crosspieces secured between the side support beams and the at least one inner support beam configured to define apertures in the floor;
the sidewalls of the bunk each comprise:
  a front post, an inner post, and a rear post secured to the side support beams of the floor,
  a top rail secured atop the front post, the inner post, and the rear post,
  a crosspiece secured between the inner post and the rear post, and
  a plurality of uprights secured between the top rail and the crosspiece, whereby the inner post, the crosspiece, and the uprights are located to define different size apertures that form the apertures in each of the sidewalls of the bunk; and
the end wall of the bunk comprises:
  a top rail,
  a crosspiece, and
  outer uprights and at least one inner upright secured between the top rail and the crosspiece, whereby the outer uprights further secure with the rear posts of the sidewalls of the bunk, further whereby the outer uprights, the inner upright, and the crosspiece are located to define different size apertures that form the apertures of the end wall of the bunk.

10. The animal feeder of claim 6, comprising a hinge coupled with the dump bed at the rear of the dump bed below the exit of the dump bed and with the bunk at the front of the bunk below the entrance of the bunk, whereby, when the lift system moves the dump bed from the lowered position to the raised position, the dump bed pivots about the hinge relative to the bunk such that the dump bed at the exit thereof communicates with the bunk at the entrance thereof, further whereby the dump bed in the raised position successively delivers animal feed held therein into the bunk for access by animals.

11. The animal feeder of claim 10, the hinge, comprising:
a first barrel connected with the dump bed at the rear of the dump bed below the exit of the dump bed;
a second barrel connected with the bunk at the front of the bunk below the entrance of the bunk;
the first barrel and the second barrel, upon a positioning of the bunk at the front of the bunk below the entrance of the bunk adjacent the dump bed at the rear of the dump bed below the exit of the dump bed, being configured to align; and
a pin configured to insert through the first barrel and the second barrel thereby forming the hinge that pivotably couples the bunk with the dump bed.

12. The animal feeder of claim 10, wherein the sidewalls of the dump bed, due to the width of the bunk being greater than the width of the dump bed, reside interior to the sidewalls of the bunk, whereby, when the lift system moves the dump bed from the lowered position to the raised position while the dump bed pivots about the hinge relative to the bunk, the dump bed at the sidewalls located at the rear of the dump bed enters the bunk at the sidewalls located at the front of the bunk such that the dump bed at the exit thereof communicates with the bunk at the entrance thereof, further whereby the dump bed in the raised position successively delivers animal feed held therein into the bunk for access by animals.

13. The animal feeder of claim 10, comprising:
a first brace connected at a first end with the frame and at a second end with one of the sidewalls of the bunk;
a second brace connected at a first end with the frame and at a second end with an opposite one of the sidewalls of the bunk; and
the first and second braces rigidly connecting the bunk with the frame such that the bunk is suspended at the rear of the dump bed adjacent the exit thereof.

14. The animal feeder of claim 13, wherein disassembly of the hinge and disconnection of the first and second braces from the bunk allows removal of the bunk from the dump trailer.

15. The animal feeder of claim 6, wherein:
the animal feed comprises at least a first hay bale and a second hay bale;
the dump bed holds the first hay bale and the second hay bale therein;
the dump bed, when the lift system moves the dump bed from the lowered position to the raised position, pivots relative to the bunk such that the dump bed at the exit thereof communicates with the bunk at the entrance thereof;
the dump bed in the raised position delivers the first bale into the bunk for access by animals; and
the dump bed, upon animals consuming the first hay bale within the bunk, delivers the second hay bale into the bunk for access by animals.

16. The animal feeder of claim 6, comprising a feed container configured to fit within the bunk, the feed container defining a continuous interior surface whereby the feed container holds discrete animal feed therein accessible to animals through the bunk.

17. The animal feeder of claim 16, the feed container, comprising:
a floor;
sidewalls supported by the floor at sides of the floor;
an end wall supported by the floor at a rear of the floor opposite to a front of the floor;
the feed container being configured to fit within the bunk such that the sidewalls of the feed container contact respectively the sidewalls of the bunk and the end wall of the feed container contacts respectively the end wall of the bunk.

18. The animal feeder of claim 6 +6, wherein:
the bunk includes a feed container fit therein;
the animal feed comprises discrete animal feed;
the dump bed holds the discrete animal feed therein;
the dump bed, when the lift system moves the dump bed from the lowered position to the raised position, pivots relative to the bunk such that the dump bed at the exit thereof communicates with the feed container at an entrance thereof;
the dump bed in the raised position delivers the discrete animal feed into the feed container for access by animals through the bunk; and
the dump bed, upon animals consuming the discrete animal feed within the feed container, re-delivers the discrete animal feed held therein into the feed container for access by animals until depletion of the discrete animal feed held within the dump bed.

19. An animal feeder moveable between a feed transport position and a feed delivery position that successively delivers animal feed contained within the animal feeder, comprising:

a dump trailer including a lowered transport position that locates the animal feeder in the feed transport position and a raised delivery position that locates the animal feeder in the feed delivery position, the dump trailer comprising:

a dump bed adapted to hold animal feed therein, the dump bed including a floor supporting sidewalls and a front wall, whereby the floor and the sidewalls at a rear of the dump bed define an exit from the dump bed, a frame configured to support the dump bed, the dump bed being pivotable relative to the frame, and a lift system connecting the dump bed with the frame, the lift system being configured to lower the dump bed to a lowered position such that the dump bed pivots atop the frame thereby placing the dump trailer in the lowered transport position, the lift system further being configured to raise the dump bed to a raised position such that the dump bed pivots over the frame thereby placing the dump trailer in the raised delivery position;

a bunk, comprising a floor supporting sidewalls and an end wall, whereby the floor and the sidewalls at a front of the bunk define an entrance of the bunk, further whereby the sidewalls and the end wall include apertures that provide animals access to animal feed held within the bunk;

the bunk being rigidly connected with the frame;

the bunk being connected with the dump bed at the rear of the dump bed adjacent the exit of the dump bed; and the dump bed being pivotable relative to the bunk, whereby, when the lift system moves the dump bed from the lowered position to the raised position, the dump bed pivots relative to the bunk such that the dump bed at the exit thereof communicates with the bunk at the entrance thereof, further whereby the dump bed in the raised position successively delivers animal feed held therein into the bunk for access by animals.

20. The animal feeder of claim 19, wherein, upon animals consuming the animal feed within the bunk, the dump bed re-delivers the animal feed held therein into the bunk for access by animals until depletion of the animal feed held within the dump bed.

21. The animal feeder of claim 19, wherein:

the bunk includes a width greater than a width of the dump bed; and the sidewalls of the dump bed, due to the width of the bunk being greater than the width of the dump bed, reside interior to the sidewalls of the bunk, whereby, when the lift system moves the dump bed from the lowered position to the raised position while the dump bed pivots relative to the bunk, the dump bed at the sidewalls located at the rear of the dump bed enters the bunk at the sidewalls located at the front of the bunk such that the dump bed at the exit thereof communicates with the bunk at the entrance thereof, further whereby the dump bed in the raised position successively delivers animal feed held therein into the bunk for access by animals.

22. The animal feeder of claim 19, comprising a feed container configured to fit within the bunk, the feed container defining a continuous interior surface whereby the feed container holds discrete animal feed therein accessible to animals through the bunk.

\* \* \* \* \*